US00RE50469E

(19) United States
(12) Reissued Patent
Yang et al.

(10) Patent Number: US RE50,469 E
(45) Date of Reissued Patent: Jun. 24, 2025

(54) TONE PLAN FOR LTF COMPRESSION

(71) Applicant: QUALCOMM Incorporated, San Diego, CA (US)

(72) Inventors: Lin Yang, San Diego, CA (US); Dung Ngoc Doan, San Diego, CA (US); Bin Tian, San Diego, CA (US); Sameer Vermani, San Diego, CA (US)

(73) Assignee: QUALCOMM Incorporated, San Diego, CA (US)

(21) Appl. No.: 18/346,647

(22) Filed: Jul. 3, 2023

Related U.S. Patent Documents

Reissue of:
(64) Patent No.: 10,154,476
Issued: Dec. 11, 2018
Appl. No.: 14/843,538
Filed: Sep. 2, 2015

U.S. Applications:
(60) Provisional application No. 62/046,086, filed on Sep. 4, 2014, provisional application No. 62/054,932, filed
(Continued)

(51) Int. Cl.
*H04L 5/00* (2006.01)
*H04L 25/02* (2006.01)
(Continued)

(52) U.S. Cl.
CPC ..... *H04W 72/04* (2013.01); *H04L 5/0044* (2013.01); *H04L 5/0048* (2013.01);
(Continued)

(58) Field of Classification Search
CPC .... H04W 72/04; H04W 28/20; H04L 5/0044; H04L 5/0048; H04L 27/2602; H04L 25/0284
See application file for complete search history.

(56) References Cited

U.S. PATENT DOCUMENTS 8,494,075 B2 7/2013 Shi et al.
8,989,102 B2 * 3/2015 Kenney ..... H04L 27/2613 370/252
(Continued)

FOREIGN PATENT DOCUMENTS

CN 102118343 A 7/2011
CN 103563283 A 2/2014
(Continued)

OTHER PUBLICATIONS

International Preliminary Report on Patentability—PCT/US2015/048300, The International Bureau of WIPO—Geneva, Switzerland, Mar. 16, 2017.
(Continued)

*Primary Examiner* — Luke S Wassum
(74) *Attorney, Agent, or Firm* — Kevin M. Donnelly; ArentFox Schiff LLP

(57) ABSTRACT

A method, an apparatus, and a computer program product for wireless communication are provided. In one aspect, an apparatus is configured to transmit user data in a first symbol of a first symbol type. The first symbol type has a first symbol duration, a first frequency bandwidth, and a first tone plan. The first tone plan includes a first valid start tone index, a first valid end tone index, and a first set of DC tones. The apparatus is further configured to transmit an LTF in a second symbol of a second symbol type. The second symbol type has a second symbol duration, a second frequency bandwidth, and a second tone plan. The second tone plan includes a second valid start tone index, a second valid end tone index, and a second set of DC tones.

22 Claims, 9 Drawing Sheets

Related U.S. Application Data on Sep. 24, 2014, provisional application No. 62/064,935, filed on Oct. 16, 2014, provisional application No. 62/067,260, filed on Oct. 22, 2014.

(51) Int. Cl.
*H04L 27/26* (2006.01)
*H04W 28/20* (2009.01)
*H04W 72/04* (2023.01)

(52) U.S. Cl.
CPC ..... *H04L 25/0284* (2013.01); *H04L 27/2602* (2013.01); *H04W 28/20* (2013.01)

(56) References Cited

U.S. PATENT DOCUMENTS

| | | | | |
|---|---|---|---|---|
| 9,288,096 | B2 | 3/2016 | Jones, IV et al. | |
| 9,628,310 | B2 * | 4/2017 | Lee | H04L 25/0204 |
| 9,655,040 | B2 * | 5/2017 | Kenney | H04W 52/02 |
| 10,154,476 | B2 | 12/2018 | Yang et al. | |
| 10,958,391 | B2 * | 3/2021 | Yang | H04L 5/0046 |
| 11,683,751 | B2 * | 6/2023 | Kenney | H04L 69/22 370/311 |
| 2010/0260159 | A1 | 10/2010 | Zhang et al. | |
| 2011/0026623 | A1 * | 2/2011 | Srinivasa | H04L 1/0016 375/260 |
| 2011/0255620 | A1 | 10/2011 | Jones, IV et al. | |
| 2012/0230448 | A1 * | 9/2012 | Kang | H03M 13/6527 375/295 |
| 2012/0324315 | A1 * | 12/2012 | Zhang | H04L 1/004 714/776 |
| 2013/0107893 | A1 * | 5/2013 | Zhang | H04L 1/00 370/474 |
| 2013/0315163 | A1 * | 11/2013 | Zhang | H04L 5/001 370/329 |
| 2014/0185662 | A1 | 7/2014 | Azizi et al. | |
| 2015/0117227 | A1 * | 4/2015 | Zhang | H04L 1/0057 370/245 |
| 2015/0146653 | A1 * | 5/2015 | Zhang | H04L 5/0041 370/329 |
| 2015/0334708 | A1 * | 11/2015 | Lee | H04W 72/0446 370/329 |

FOREIGN PATENT DOCUMENTS

| | | | |
|---|---|---|---|
| RU | 2012121432 | A | 6/2014 |
| WO | 2011014685 | A2 | 2/2011 |
| WO | 2011071894 | | 6/2011 |
| WO | 2011130473 | | 10/2011 |
| WO | 2012027700 | | 3/2012 |
| WO | 2015171499 | A2 | 11/2015 |
| WO | 2016015447 | A1 | 2/2016 |

OTHER PUBLICATIONS

Internationalsearch Report and Written Opinion—PCT/US2015/048300—ISA/EPO—Nov. 20, 2015.

Zhang H., et al., "HE-LTF Proposal; 11-15-0349-02-00ax-he-ltf-Proposal", IEEE Draft, 11-15-0349-02-00AX-HE-LTF-Proposal, IEEE-SA Mentor, Piscataway, NJ USA, vol. 802.11ax, No. 2, Mar. 10, 2015 (Mar. 10, 2015), pp. 1-43, KP068082992, [retrieved on Mar. 10, 2015].

* cited by examiner

300

| | | 20 MHz | 40 MHz | 80 MHz |
|---|---|---|---|---|
| Row 1 | **Usable tone index in 4x** | [-122:-2]<br>[2:122] | [-250:-130][-126:-6]<br>[6:126][130:250] | [-506:-4]<br>[4:506] |
| Row 2 | **Usable tone index in 1x (DC Option 1)** | [-31:-1]<br>[1:30] | [-63:-2]<br>[2:62] | [-127:-2]<br>[2:126] |
| Row 3 | **Usable tone index in 1x (DC Option 2)** | [-31:-1]<br>[1:30] | [-63:-1]<br>[1:62] | [-127:-1]<br>[1:126] |
| Row 4 | **Usable tone index in 1x (DC Option 1)** | [-30:-1]<br>[1:30] | [-62:-2]<br>[2:62] | [-126:-2]<br>[2:126] |
| Row 5 | **Usable tone index in 1x (DC Option 2)** | [-30:-1]<br>[1:30] | [-62:-1]<br>[1:62] | [-126:-1]<br>[1:126] |
| Row 6 | **Usable tone index in 2x (DC Option 1)** | [-61:-1]<br>[1:61] | [-125:-2]<br>[2:125] | [-253:-2]<br>[2:253] |
| Row 7 | **Usable tone index in 2x (DC Option 2)** | [-61:-1]<br>[1:61] | [-125:-1]<br>[1:125] | [-253:-1]<br>[1:253] |

FIG. 3A

330

| | | 20 MHz | 40 MHz | 80 MHz |
|---|---|---|---|---|
| Row 1 | **Usable tone index in 4x** | [-122:-2]<br>[2:122] | [-250:-130][-126:-6]<br>[6:126][130:250] | [-506:-4]<br>[4:506] |
| Row 2 | **Useable tone index in 2x (DC Option 1)** | [-61:-2]<br>[2:61] | [-125:-3]<br>[3:125] | [-253:-3]<br>[3:253] |
| Row 3 | **Usable tone index in 2x (DC Option 2)** | [-61:-2]<br>[2:61] | [-125:-2]<br>[2:125] | [-253:-2]<br>[2:253] |

FIG. 3B

360

| | | 20 MHz | 40 MHz | 80 MHz |
|---|---|---|---|---|
| Row 1 | **Usable tone index in 4x** | [-122:-2]<br>[2:122] | [-250:-130][-126:-6]<br>[6:126][130:250] | [-506:-2]<br>[2:506] |
| Row 2 | **Usable tone index in 1x (Option 1)** | [-31:30]<br>With half tone up shift | [-63:-2][1:62]<br>With half tone up shift | [-127:126]<br>With half tone up shift |
| Row 3 | **Usable tone index in 1x (Option 2)** | [-30:31]<br>With half tone down shift | [-62:-1][2:63]<br>With half tone down shift | [-126:127]<br>With half tone down shift |

FIG. 3C

400

| | | 20 MHz | 40 MHz | 80 MHz |
|---|---|---|---|---|
| Row 1 | **Usable tone index in 1x** | [-28:-1]<br>[1:28] | [-58:-2]<br>[2:58] | [-122:-2]<br>[2:122] |
| Row 2 | **Usable tone index in 4x<br>#data/#pilot** | [-112:-2][2:112]<br>210/12 | [-232:-4][4:232]<br>444/14 | [-488:-4][4:488]<br>954/16 |

FIG. 4A

450

| | | 20 MHz | 40 MHz | 80 MHz |
|---|---|---|---|---|
| Row 1 | **Usable tone index in 2x** | [-58:-2]<br>[2:58] | [-122:-2]<br>[2:122] | [-250:-3]<br>[3:250] |
| Row 2 | **Usable tone index in 4x<br>#data/#pilot** | [-116:-3][3:116]<br>216/12 | [-244:-3][3:244]<br>468/16 | [-500:-4][4:500]<br>978/16 |

FIG. 4B

TONE PLAN FOR LTF COMPRESSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application *is a Reissue of U.S. Pat. No. 10,154,476, entitled "Tone Plan For LTF Compression" and issued on Dec. 11, 2018, which* claims the benefit of U.S. Provisional Application Ser. No. 62/046,086, entitled "Tone Plan for LTF Compression" and filed on Sep. 4, 2014, U.S. Provisional Application Ser. No. 62/054,932, entitled "Tone Plan for LTF Compression" and filed on Sep. 24, 2014, U.S. Provisional Application Ser. No. 62/064,935, entitled "Tone Plan for LTF Compression" and filed on Oct. 16, 2014, and U.S. Provisional Application Ser. No. 62/067,260, entitled "Tone Plan for LTF Compression" and filed on Oct. 22, 2014, all of which are expressly incorporated by reference herein in their entirety.

BACKGROUND

Field

The present disclosure relates generally to communication systems, and more particularly, to tone plans for long training field compression.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides a wireless device (e.g., an access point or a station) for wireless communication. The wireless device may be configured to transmit user data in a first symbol of a first symbol type. The first symbol type may have a first symbol duration, a first frequency bandwidth, and a first tone plan. The first tone plan may have a first valid start tone index, a first valid end tone index, and a first set of direct current (DC) tones. The wireless device may be configured to transmit a long training field in a second symbol of a second symbol type. The second symbol type may have a second symbol duration, a second frequency bandwidth, and a second tone plan. The second tone plan may have a second valid start tone index, a second valid end tone index, and a second set of DC tones.

BRIEF DESCRIPTION OF THE DRAWINGS

FIGS. 3A-C are exemplary diagrams of tone plans/indices for LTF compression.

FIGS. 4A-B are exemplary diagrams of tone plans/indices for LTF compression.

DETAILED DESCRIPTION

Figure 1:
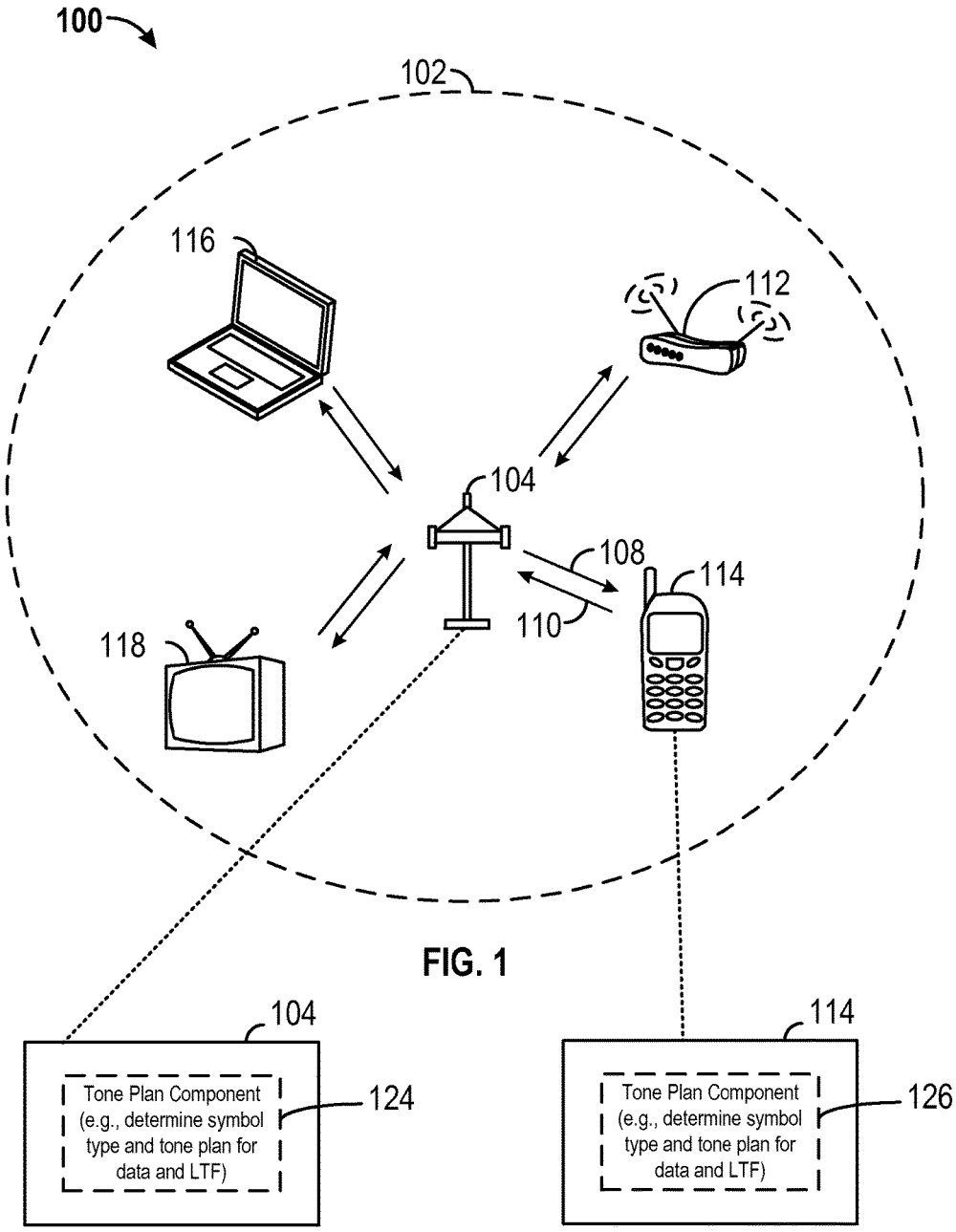
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams (or multi-streams), and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a tone plan component 124 configured to transmit user data in a first symbol of a first symbol type to one or more STAs (e.g., STA 114). The first symbol type may have a first symbol duration, a first frequency bandwidth, and a first tone plan, and the first tone plan may include a first valid start tone index, a first valid end tone index, and a first set of DC tones. The tone plan component 124 may be configured to transmit an LTF in a second symbol of a second symbol type. The second symbol type may have a second symbol duration, a second frequency bandwidth, and a second tone plan, and the second tone plan may have a second valid start tone index, a second valid end tone index, and a second set of DC tones.

In another aspect, the STA 114 may include one or more components for performing various functions. For example, the STA 114 may include a tone plan component 126 configured to transmit user data in a first symbol of a first symbol type to one or more APs (e.g., AP 104). The first symbol type may have a first symbol duration, a first frequency bandwidth, and a first tone plan. The first tone plan may have a first valid start tone index, a first valid end tone index, and a first set of DC tones. The tone plan component 126 may be configured to transmit an LTF in a second symbol of a second symbol type. The second symbol type has a second symbol duration, a second frequency bandwidth, and a second tone plan, and the second tone plan may have a second valid start tone index, a second valid end tone index, and a second set of DC tones.

In Wi-Fi networks, user data and data/information used for channel estimation, among other information, may be transmitted in frames that include multiple symbols (e.g., OFDM symbols). User data may be transmitted in data symbols and information used for channel estimation may be transmitted in long training field (LTF) symbols. Each symbol may include a number of tones (or frequencies) on which information may be transmitted. A symbol also has symbol duration (e.g. 1×, 2×, 4× symbol duration or another multiple of the 1× symbol duration). Symbols with longer symbol duration (e.g., 4× symbol duration of 12.8 μs) may have more tones and longer time duration, and symbols with shorter symbol duration (e.g. 1× symbol duration of 3.2 μs) may have less tones and shorter time duration. For example, in a first symbol with a 4× symbol duration, the first symbol may be four times longer in time than a second symbol with a 1× symbol duration. The first symbol may have four times as many tones as the second symbol with a 1× symbol duration. The first symbol may have one-fourth of the tone spacing compared to a second symbol with 1× symbol duration. If a network transmits frames that utilize symbols with a 4× symbol duration in the LTF symbols and the data symbols, the overhead with respect to the LTF symbols may be very large. This may be especially true for multi-streams and short to mid Physical Layer Convergence Protocol (PLCP) Protocol Data Unit (PPDU) sizes. Longer symbol durations may also result in a larger phase drift in uplink multi-user MIMO with a given residual carrier frequency offset (CFO). As such, a need exists to reduce LTF symbol overhead in wireless networks that utilize LTF symbols with greater symbol duration (e.g., 4× symbol duration)

Figure 2:
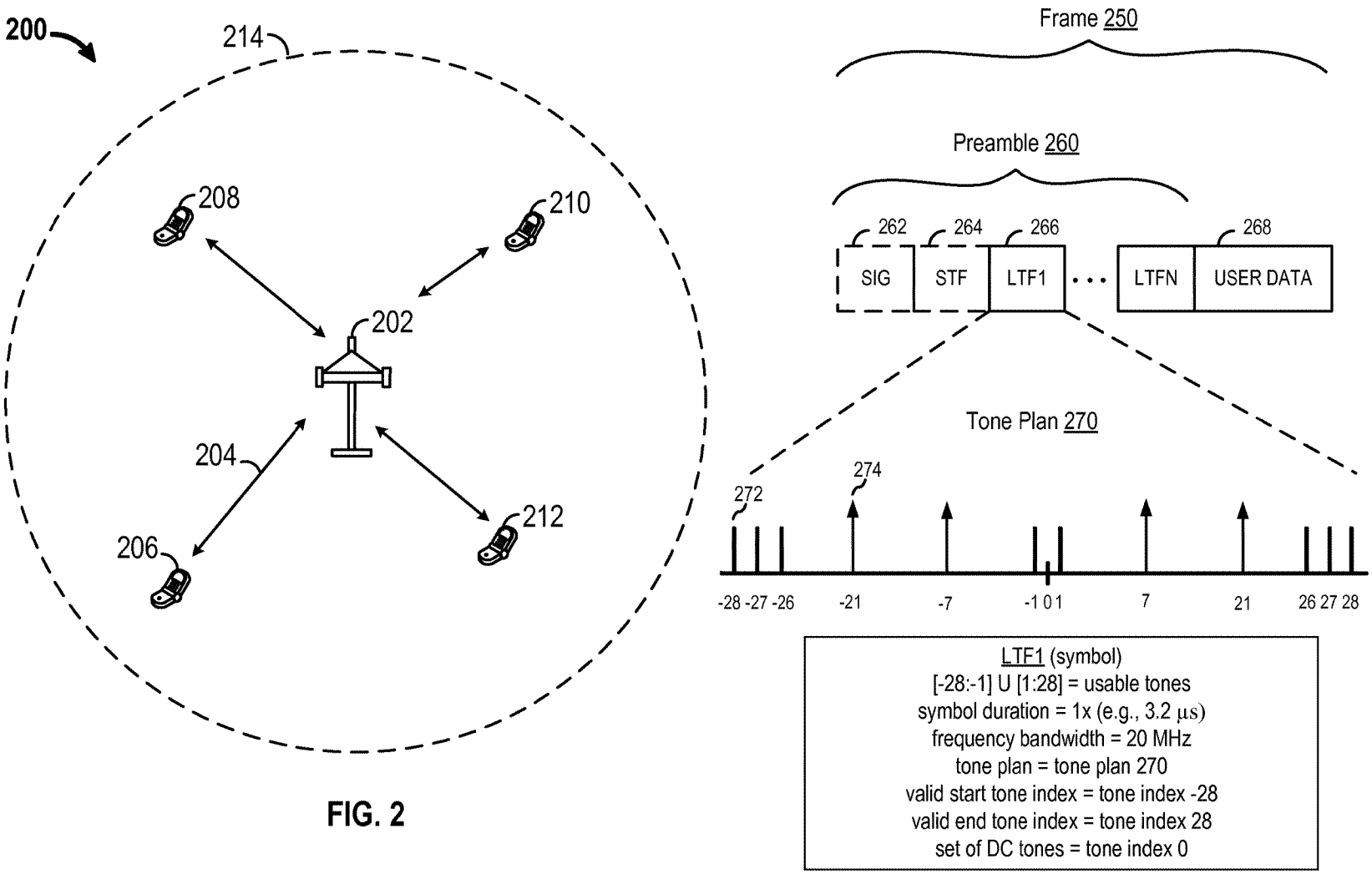
FIG. 2 is a diagram of a wireless network and a tone plan.

FIG. 2 is a diagram 200 of a wireless network (e.g., a Wi-Fi network) and a tone plan. The diagram 200 illustrates an AP 202 broadcasting/transmitting within a service area 214. STAs 206, 208, 210, 212 are within the service area 214 of the AP 202 (although only 4 STAs are shown in FIG. 2, more or less STAs may be within the service area 214).

The AP 202 may transmit symbols (e.g., data symbols or LTF symbols) 204 to one or more STAs (e.g., STAs 206, 208, 210, 212) in one or more frames, and vice versa. A frame 250 may include a preamble 260 and data symbols 268. The preamble 260 may be considered a header of the frame 250 with information identifying a modulation scheme, a transmission rate, and a length of time to transmit the frame 250. The preamble 260 may include a signal (SIG) field 262, a short training field (STF) 264, and one or more long training field (LTF) symbols 266 (e.g., LTF1, LTF2, . . . , LTFN). Each symbol in the LTF symbols 266 may include at least part of the LTF. The SIG field 262 may be used to transfer rate and length information. The STF 264 may be used to improve automatic gain control (AGC) in a multi-transmit and multi-receive system. For example, when a received signal is weak, AGC algorithms at a receiving device may boost the gain stages at the receiving device to bring the received signal to an acceptable signal to noise ratio. The LTF symbols 266 may be used to provide the information needed for a receiver (e.g., the STA 206) to perform channel estimation. The number of LTF symbols may be equal to or greater than the number of space-time streams from different STAs. For example, if there are 4 STAs, there may be 4 LTF symbols (i.e. LTF1, LTF2, LTF3, LTF4). The data symbols 268 may contain the user data to be communicated between the STA 206, for example, and the AP 202.

In one aspect, the LTF symbols 266 (and data symbols 268) may have a tone plan that indicates which tones are guard tones, data tones, pilot tones, and DC tones. For example, tone plan 270 is an example of a tone plan for a 20 megahertz (MHz) symbol with 1× symbol duration, in which the 20 MHz refers to the frequency bandwidth of the symbol. The tone plan 270 has 64 tones located within a tone indices range of −32 to 31 or [−32:31]. As shown in FIG. 2, however, not all tone indices are pictured. The tone indices not pictured [−32:−29] and [29:31] are guard tones, which are tones that may have zero amplitude and are used to provide isolation or system separation from neighboring transmissions/symbols in order to reduce the likelihood of tones from different symbols bleeding together. A DC tone, located at tone index 0 in this example, may have zero amplitude or no power and may be used for AGC setup. In an aspect, the DC tone may not carry information. In another aspect, the DC tone may be used to locate the radio frequency (RF) center frequency of a transmitting device. Although this example illustrates one DC tone at tone index 0, additional DC tones may be used (e.g., 3 DC tones may be located at tone indices −1, 0, and 1). In this example, the remaining tone indices [−28:−1] and [1:28] contain usable (or useful) tones that may used to transmit data (e.g., for channel estimation) and pilot signals (e.g., for phase drift correction). In the tone plan 270, data 272 may be transmitted on tone indices −28, −27, −26, −10, −5, 5, 10, 26, 27, and 28, for example. A pilot signal 274 for phase drift correction, for example, may be transmitted on tone index −21. Additional pilot signals (as indicted by vertical arrows in FIG. 2) may be transmitted on tone indices −7, 7, and 21. Because the first valid tone, after the guard tones, on which data or pilot signals may be transmitted is located on tone index −28, this tone index may be known as a valid start tone index. Similarly, tone index 28 may be known as a valid end tone index because tone index 28 is the last valid tone on which data or pilot signals may be transmitted before reaching tone indices [29:31], which are reserved for guard tones. In sum, the tone plan 270 has usable tones within a tone indices range of [−28:−1] and [1:28]. The DC tones may be located at tone index 0, and the non-DC tones may include the guard tones and the usable tones (which may include the data tones for transmitting data and the pilot tones for transmitting pilot signals).

Referring again to FIG. 2, although the LTF symbol 266 (e.g., LTF1) has a 1× symbol duration as evidenced by the tone plan 270, some wireless networks may use symbols with a 4× symbol duration. Symbols with a 4× symbol duration may have a total of 256 tones of which 242 tones may be usable or valid tones (excluding guard tones and DC tones). For example, a symbol with a 4× symbol duration may have usable tones within a tone indices range of [−122:−2] and [2:122]. In one configuration, three DC tones may be located on tone indices [−1:1], and guard tones may be located on tone indices [−128:−123] and [123:127]. However, when a wireless network uses symbols with a 4× symbol duration for both LTF symbols (e.g., LTF symbols 266) and data symbols (e.g., data symbols 268)), the overhead may be large as previously discussed. The longer symbol length also increases phase drift.

To reduce the LTF symbol overhead in networks that use symbols with a 4× symbol duration, two approaches may be followed separately. In the first approach, devices in the wireless network may continue to use LTF symbols with 4× symbol durations, but the tones within the LTF symbols may be grouped, according to a group number (Ng), and shared among STAs. For example, if the group number is 2 (Ng=2), and there are 2 STAs 206, 208, each STA may use every other tone. In this example, the STA 206 may transmit on the even tones and the STA 208 may transmit on the odd tones. When the AP 202, performs channel estimation for the STAs 206, 208 on the received LTF symbols 266 (e.g., LTF1), the AP 202 may perform interpolation for the odd tones for the STA 206 and for the even tones for the STA 208. Similarly, if the group number is 4 (Ng=4), and there are 4 STAs 206, 208, 210, 212, each STA may transmit on every fourth tone in the LTF symbols 266. As with Ng=2, when Ng=4, interpolation may be used by the receiver (e.g., the AP 202) to reconstruct channel estimates of unsampled tones. In another aspect, when the tone grouping (Ng) is greater than the number of STAs (or users or streams), for example, Ng=4 and the number of STAs is 3, the per tone power on the tones being used will be scaled up such that the total transmit power on the LTF symbol remains the same as on an LTF symbol in which all the usable tones are being populated. The scaling factor with respect to the transmit power is a function of the number of streams or STAs. In yet another aspect, if Ng=4, but there is only one stream or one user, this is equivalent to transmitting an LTF symbol with 1× symbol duration with Ng=1 (without any unpopulated tones). Similarly, if there are 2 users (or STAs), this is equivalent to transmitting an LTF symbol with 2× symbol duration and Ng=2 without wasted tones.

In the second approach, instead of using tone grouping within the LTF symbol, the LTF symbol duration may be reduced. For example, instead of using 4× symbol durations for the LTF symbols 266, 1× or 2× symbol durations may be used to represent a symbol with 4× symbol duration. In one aspect, the information in an LTF symbol with a 4× symbol duration may be compressed into an LTF symbol with a 1× symbol duration. Two issues may arise, however, when using reduced LTF symbol durations. The first issue relates to extrapolation challenges for channel estimation on the edge tones. For example, a 20 MHz LTF symbol with a 1× symbol duration has 56 usable tones out of 64 total tones. A 20 MHz LTF symbol with a 4× symbol duration has 242 usable tones out of 256 total tones. The 242 usable tones are effectively 4 times 60.5 tones. In effect, without modifying the tone plan for a symbol with a 1× symbol duration, the symbol would need 60.5 usable tones to represent a symbol with a 4× symbol duration, assuming a compression factor or grouping number) of 4. However, because a 20 MHz symbol with a 1× symbol duration has only 56 usable tones, an average of 4.5 tones in the edge tones would be missing.

Given the number of missing tones, channel interpolation may not be used. Channel extrapolation may be used, but channel extrapolation would introduce more errors and degrade performance.

A second issue when using an LTF symbol with reduced symbol duration relates to channel estimation around the DC tones in a symbol with a 4× symbol duration. For example, an 80 MHz symbol with a 4× symbol duration may have 3-7 DC tones. To map the channel estimates on the tone indices −4 and +4 in a symbol with 4× symbol duration onto a symbol with 1× symbol duration, one way is to populate those tones at tone indices −4 and +4 onto tone indices −1 and +1 on the symbol (e.g., LTF symbol) with 1× symbol duration. However, this would leave only one DC tone at index 0. In some instances, an 80 MHz symbol with a 1× symbol duration has a tone plan that calls for 3 DC tones with a notch filter that has a corresponding width of approximately 3 DC tones. As such, assuming the notch filter only depends on the sampling rate, if the same notch filter is used (e.g., the same notch filter with a 3 tone width), the received LTF symbols at 1× symbol duration may have tones located at indices −1 and +1 cut off by the notch filtering, thereby preventing the tones from being used for channel estimation. The following figures discuss a modified tone plan that reduces LTF symbol overhead and overcomes the aforementioned issues.

FIGS. 3A-C are exemplary diagrams 300, 330, 360 of tone plans/indices for LTF compression. To resolve the edge tone channel estimation issue, FIG. 3A illustrates an existing LTF symbol with a 4× symbol duration (row 1) that is used to derive a modified tone plan for LTF symbols with a 1× symbol duration (rows 2-3), a symmetrical modified tone plan for LTF symbols with a 1× symbol duration (rows 4-5), or a modified tone plan for LTF symbols with a 2× symbol duration (rows 6-7). To resolve the second issue regarding channel estimation around the DC tones, FIG. 3A offers two options. DC Option 1 (e.g., in row 2), assumes that an existing notch filter (e.g., as used in the current IEEE 802.11ac products) is used for the modified LTF symbol with 1× symbol duration. If that is the case, then the same number of DC tones may be reserved in the modified tone plan for the LTF symbol in row 2 as in the tone plan for the existing LTF symbol with 1× symbol duration at each corresponding frequency bandwidth. By contrast, DC Option 2 (e.g., row 3) assumes that a new notch filter that is sharper and with a narrower notch may be used (as compared with the notch filter used in 802.11ac products) such that only one DC tone is needed in the tone plan of the modified LTF symbol with 1× symbol duration. This is similarly true for rows 4-7.

Referring to FIG. 3A, assuming a wireless network (e.g., the wireless network in FIGS. 1, 2) uses symbols with a 4× symbol duration, row 1 of the diagram illustrates the usable tone indices for a 20 MHz symbol, a 40 MHz symbol, and an 80 MHz symbol. For example, a 20 MHz symbol with a 4× symbol duration has usable tones over the tone indices range of [−122:−2] and [2:122]. In this example, the valid start tone index is −122 and the valid end tone index is 122. The guard tones are located at tone indices [−128:−123] and [123:127]. The DC tones are located at tone indices [−1:1]. In another example, a 40 MHz symbol with a 4× symbol duration has usable tones over the tone indices range of [−250:−130], [−126:−6], [6:126], and [130:250]. In this example, the valid start tone index is −250 and the valid end tone index is 250. In another example, an 80 MHz symbol with a 4× symbol duration has usable tones over the tone indices range of [−506:−4] and [4:506]. In this example, the valid start tone index is −506 and the valid end tone index is 506. To compress the symbols with 4× symbol duration in row 1 into a symbol with 1× symbol duration, the valid start tone index and the valid end tone index for the 20 MHz symbol, with 1× symbol duration and a modified tone plan, may be a function of the floor (and/or ceiling) of the valid start and end tone indices for the symbols in row 1 divided by 4. In one example, as shown in row 1, for a 20 MHz LTF symbol with a 4× symbol duration, the usable tones are [−122:−2] and [2:122]. For LTF compression, the valid start tone index in a 20 MHz LTF symbol with a 1× symbol duration can be the result of floor(−122/4), which is equal to −31. Similarly, the valid end tone index in the 20 MHz LTF symbol with a 1× symbol duration can be the result of floor(122/4), which is equal to 30. As such, the 20 MHz LTF symbols with 1× symbol duration in rows 2 and 3 both have tone plans with valid start and end tone indices of −31 and 30, respectively. The remaining determination for the tone plan is the number of DC tones. In DC Option 1, row 2, the assumption is that an existing notch filter (e.g., used in 802.11ac products) is used and thus the number of DC tones corresponds to the tone plans for symbols having 1× symbol duration at the various frequency bandwidths to prevent tone cut-off. In DC Option 1, the existing tone plan (e.g., in IEEE 802.11ac) for a 20 MHz symbol with 1× symbol duration calls for one DC tone. As such, tone index 0 may be reserved for the DC tone. In DC Option 2, row 3, one assumes that a narrower notch filter, and thus, only one DC tone is needed. As such, tone index 0 may be reserved for the one DC tone. In sum, the usable tone indices for a modified tone plan for a 20 MHz LTF symbol with a 1× symbol duration may have usable tone indices of [−31:−1] and [1:30] for both DC Option 1 (row 2) and DC Option 2 (row 3).

In another example, as shown in row 1, for a 40 MHz LTF symbol with a 4× symbol duration, the usable tones are [−250:−130], [−126:−6], [6:126], and [130:250]. For LTF compression, the valid start tone index in a 40 MHz LTF symbol, with a 1× symbol duration and a modified tone plan, can be the result of floor(−250/4), which is equal to −63. Similarly, the valid end tone index in the 40 MHz LTF symbol with a 1× symbol duration can be the result of floor(250/4), which is equal to 62. Referring to FIG. 3A, the 40 MHz LTF symbols with 1× symbol duration in rows 2 and 3 both have valid start and end tone indices of −63 and 62, respectively. The remaining determination is the number of DC tones. In DC Option 1, row 2, the assumption is that an existing notch filter is used and thus the number of DC tones corresponds to the existing tone plans for symbols with a 1× symbol duration at the various frequency bandwidths. In DC Option 1, row 2, the existing tone plan for a 40 MHz symbol with 1× symbol duration calls for three DC tones. As such, tone indices −1, 0, and 1 may be reserved for the DC tones. In DC Option 2, row 3, one assumes that a narrower notch filter may be used, and thus, only one DC tone is needed. As such, tone index 0 may be reserved for the DC tone. In sum, the usable tone indices for a modified tone plan for a 40 MHz LTF symbol with a 1× symbol duration may have usable tone indices of [−63:−2] and [2:62] for DC Option 1 (row 2) and [−63:−1] and [1:62] for DC Option 2 (row 3).

In yet another example, as shown in row 1, for an 80 MHz LTF symbol with a 4× symbol duration, the usable tones are [−506:−4] and [4:506]. For LTF compression, the valid start tone index in an 80 MHz LTF symbol, with a 1× symbol duration and a modified tone plan, can be the result of floor(−506/4), which is equal to −127. Similarly, the valid end tone index in the 80 MHz LTF symbol with a 1× symbol duration can be the result of floor(506/4), which is equal to 126. Referring to FIG. 3A, the modified tone plan for 80 MHz LTF symbols with 1× symbol duration in rows 2 and 3 both have valid start and end tone indices of −127 and 126, respectively. The remaining determination is the number of DC tones. In DC Option 1, row 2, the assumption is that an existing notch filter is used and thus the number of DC tones corresponds to the tone plans for symbols having 1× symbol duration at the various frequency bandwidths. In DC Option 1, the 80 MHz symbol with 1× symbol duration calls for three DC tones (e.g., in IEEE 802.11ac). As such, tone indices −1, 0, and 1 may be reserved for the DC tones. In DC Option 2, row 3, one assumes that a narrower notch filter may be used, and thus, only one DC tone is needed. As such, tone index 0 may be reserved for the DC tone. In sum, the usable tone indices for a modified tone plan for an 80 MHz LTF symbol with a 1× symbol duration may have usable tone indices of [−127:−2] and [2:126] for DC Option 1 (row 2) and [−127:−1] and [1:126] for DC Option 2 (row 3).

In the examples discussed in rows 2 and 3 of FIG. 3A, the valid start and end tone indices were asymmetric. That is, for example, for a 20 MHz LTF symbol with a 1× symbol duration in DC Option 1, the valid start tone index is −31 and the valid end tone index is 30. In another aspect, the valid start and end tone indices of a modified tone plan for a symbol with a 1× symbol duration may be symmetrical. For example, referring again to row 1, for a 20 MHz LTF symbol with a 4× symbol duration, the usable tones are [−122:−2] and [2:122]. For LTF compression, the valid start tone index in a 20 MHz LTF symbol with a 1× symbol duration can be the result of ceiling(−122/4), which is equal to −30. The valid end tone index in the 20 MHz LTF symbol with a 1× symbol duration can be the result of floor(122/4), which is equal to 30. As such, the 20 MHz LTF symbols with 1× symbol duration in rows 4 and 5 both have tone plans with valid start and end tone indices of −30 and 30, respectively. The remaining determination for the tone plan is the number of DC tones. In DC Option 1, row 4, the assumption is that an existing notch filter (e.g., used in 802.11ac products) is used and thus the number of DC tones corresponds to the tone plans for symbols having 1× symbol duration at the various frequency bandwidths to prevent tone cut-off. In DC Option 1, the existing tone plan (e.g., in IEEE 802.11ac) for a 20 MHz symbol with 1× symbol duration calls for one DC tone. As such, tone index 0 may be reserved for the DC tone. In DC Option 2, row 5, one assumes that a narrower notch filter, and thus, only one DC tone is needed. As such, tone index 0 may be reserved for the one DC tone. In sum, the usable tone indices for a modified tone plan for a 20 MHz LTF symbol with a 1× symbol duration may have usable tone indices of [−30:−1] and [1:30] for both DC Option 1 (row 4) and DC Option 2 (row 5).

In another example, as shown in row 1, for a 40 MHz LTF symbol with a 4× symbol duration, the usable tones are [−250:−130], [−126:−6], [6:126], and [130:250]. For LTF compression, the valid start tone index in a 40 MHz LTF symbol, with a 1× symbol duration and a modified tone plan, can be the result of ceiling(−250/4), which is equal to −62. The valid end tone index in the 40 MHz LTF symbol with a 1× symbol duration can be the result of floor(250/4), which is equal to 62. Referring to FIG. 3A, the 40 MHz LTF symbols with 1× symbol duration in rows 4 and 5 both have valid start and end tone indices of −62 and 62, respectively. The remaining determination is the number of DC tones. In DC Option 1, row 4, the assumption is that an existing notch filter is used and thus the number of DC tones corresponds to the existing tone plans for symbols with a 1× symbol duration at the various frequency bandwidths. In DC Option 1, row 4, the existing tone plan for a 40 MHz symbol with 1× symbol duration calls for three DC tones. As such, tone indices −1, 0, and 1 may be reserved for the DC tones. In DC Option 2, row 5, one assumes that a narrower notch filter may be used, and thus, only one DC tone is needed. As such, tone index 0 may be reserved for the DC tone. In sum, the usable tone indices for a modified tone plan for a 40 MHz LTF symbol with a 1× symbol duration may have usable tone indices of [−62:−2] and [2:62] for DC Option 1 (row 4) and [−62:−1] and [1:62] for DC Option 2 (row 5).

In yet another example, as shown in row 1, for an 80 MHz LTF symbol with a 4× symbol duration, the usable tones are [−506:−4] and [4:506]. For LTF compression, the valid start tone index in an 80 MHz LTF symbol, with a 1× symbol duration and a modified tone plan, can be the result of ceiling(−506/4), which is equal to −126. The valid end tone index in the 80 MHz LTF symbol with a 1× symbol duration can be the result of floor(506/4), which is equal to 126. Referring to FIG. 3A, the modified tone plan for 80 MHz LTF symbols with 1× symbol duration in rows 4 and 5 both have valid start and end tone indices of −126 and 126, respectively. The remaining determination is the number of DC tones. In DC Option 1, row 4, the assumption is that an existing notch filter is used and thus the number of DC tones corresponds to the tone plans for symbols having 1× symbol duration at the various frequency bandwidths. In DC Option 1, the 80 MHz symbol with 1× symbol duration calls for three DC tones (e.g., in IEEE 802.11ac). As such, tone indices −1, 0, and 1 may be reserved for the DC tones. In DC Option 2, row 5, one assumes that a narrower notch filter may be used, and thus, only one DC tone is needed. As such, tone index 0 may be reserved for the DC tone. In sum, the usable tone indices for a modified tone plan for an 80 MHz LTF symbol with a 1× symbol duration may have usable tone indices of [−126:−2] and [2:126] for DC Option 1 (row 4) and [−126:−1] and [1:126] for DC Option 2 (row 5).

The aforementioned examples with respect to rows 2-5 of FIG. 3A illustrate how the valid start and end tone indices for usable tones, along with DC tone indices, may be calculated for a modified tone plan in an LTF symbol with a 1× symbol duration from an existing tone plan of an LTF symbol with a 4× symbol duration. Rows 6 and 7 of FIG. 3A illustrate the valid start and end tone indices for usable tones, along with the DC tone indices, for a modified tone plan in an LTF symbol with a 2× symbol duration. Referring to rows 6 and 7, for a 20 MHz LTF symbol with a 4× symbol duration, the usable tones are [−122:−2] and [2:122]. For LTF compression, the valid start tone index in a 20 MHz LTF symbol with a 2× symbol duration can be the result of floor(−122/2), which is equal to −61. The valid end tone index in the 20 MHz LTF symbol with a 1× symbol duration can be the result of floor(122/2), which is equal to 61. As such, the 20 MHz LTF symbols with 2× symbol duration in rows 6 and 7 both have tone plans with valid start and end tone indices of −61 and 61, respectively. The remaining determination for the tone plan is the number of DC tones. In DC Option 1, row 6, the assumption is that an existing notch filter (e.g., used in 802.11ac products) is used and thus the number of DC tones corresponds to the tone plans for symbols having 2× symbol duration at the various frequency bandwidths to prevent tone cut-off. In DC Option 1, the existing tone plan (e.g., in IEEE 802.11ac) for a 20 MHz symbol with 2× symbol duration calls for one DC tone. As such, tone index 0 may be reserved for the DC tone. In DC Option 2, row 7, one assumes that a narrower notch filter, and thus, only one DC tone is needed. As such, tone index 0 may be reserved for the one DC tone. In sum, the usable tone indices for a modified tone plan for a 20 MHz LTF symbol with a 2× symbol duration may have usable tone indices of [−61:−1] and [1:61] for both DC Option 1 (row 6) and DC Option 2 (row 7).

In another example, as shown in row 1, for a 40 MHz LTF symbol with a 4× symbol duration, the usable tones are [−250:−130], [−126:−6], [6:126], and [130:250]. For LTF compression, the valid start tone index in a 40 MHz LTF symbol, with a 2× symbol duration and a modified tone plan, can be the result of floor(−250/2), which is equal to −125. The valid end tone index in the 40 MHz LTF symbol with a 2× symbol duration can be the result of floor(250/2), which is equal to 125. Referring to FIG. 3A, the 40 MHz LTF symbols with 2× symbol duration in rows 6 and 7 both have valid start and end tone indices of −125 and 125, respectively. The remaining determination is the number of DC tones. In DC Option 1, row 6, the assumption is that an existing notch filter is used and thus the number of DC tones corresponds to the existing tone plans for symbols with a 2× symbol duration at the various frequency bandwidths. In DC Option 1, row 6, the existing tone plan for a 40 MHz symbol with 2× symbol duration calls for three DC tones. As such, tone indices −1, 0, and 1 may be reserved for the DC tones. In DC Option 2, row 7, one assumes that a narrower notch filter may be used, and thus, only one DC tone is needed. As such, tone index 0 may be reserved for the DC tone. In sum, the usable tone indices for a modified tone plan for a 40 MHz LTF symbol with a 2× symbol duration may have usable tone indices of [−125:−2] and [2:125] for DC Option 1 (row 6) and [−125:−1] and [1:125] for DC Option 2 (row 7).

In yet another example, as shown in row 1, for an 80 MHz LTF symbol with a 4× symbol duration, the usable tones are [−506:−4] and [4:506]. For LTF compression, the valid start tone index in an 80 MHz LTF symbol, with a 2× symbol duration and a modified tone plan, can be the result of floor(−506/2), which is equal to −253. The valid end tone index in the 80 MHz LTF symbol with a 2× symbol duration can be the result of floor(506/2), which is equal to 253. Referring to FIG. 3A, the modified tone plan for 80 MHz LTF symbols with 1× symbol duration in rows 6 and 7 both have valid start and end tone indices of −253 and 253, respectively. The remaining determination is the number of DC tones. In DC Option 1, row 6, the assumption is that an existing notch filter is used and thus the number of DC tones corresponds to the tone plans for symbols having 2× symbol duration at the various frequency bandwidths. In DC Option 1, the 80 MHz symbol with 2× symbol duration calls for three DC tones (e.g., in IEEE 802.11ac). As such, tone indices −1, 0, and 1 may be reserved for the DC tones. In DC Option 2, row 6, one assumes that a narrower notch filter may be used, and thus, only one DC tone is needed. As such, tone index 0 may be reserved for the DC tone. In sum, the usable tone indices for a modified tone plan for an 80 MHz LTF symbol with a 2× symbol duration may have usable tone indices of [−253:−2] and [2:253] for DC Option 1 (row 6) and [−253:−1] and [1:253] for DC Option 2 (row 7).

In both types of LTF symbols (e.g., 1× symbol duration and 2× symbol duration), LTF compression option allows for reduced LTF symbol overhead compared to LTF symbols with 4× symbol duration. In an aspect, the modified tone plans in rows 2-7 of FIG. 3A may be preconfigured (e.g., hard-coded in a STA or an AP).

In sum, an AP or a STA may transmit frames containing LTF symbols with the modified tone plans while using symbols with 4× symbol duration for data. For example, an AP (e.g., AP 202) may transmit to a STA (e.g., STA 206) user data in a 20 MHz data symbol (e.g., the data symbol 268), in which the 20 MHz data symbol has a 4× symbol duration and a usable tone indices range of [−122:2] and [2:122]. Additionally, for channel estimation purposes, the AP may transmit to the STA an LTF (or at least part of an LTF) in a 20 MHz LTF symbol (e.g., the LTF symbol 266), in which the 20 MHz LTF symbol has a 1× symbol duration and a usable tone indices range of [−30:−1] and [1:30].

In another embodiment, FIG. 3B illustrates an existing LTF symbol with a 4× symbol duration (row 1) that is used to derive a modified tone plan for LTF symbols with a 2× symbol duration (row 2). To resolve the second issue regarding channel estimation around the DC tones, FIG. 3B offers two options. DC Option 1 (e.g., in row 2) assumes that the same corresponding notch filter used for a 1×LTF symbol in IEEE 802.11ac is used for the 2×LTF symbol. As such, if 802.11ac has 1 DC tone for a 1× symbol duration, then 3 DC tones may be reserved for a 2× symbol duration (pictured), and if 802.11ac has 3 DC tones for a 1× symbol duration, then 5 DC tones may be reserved for a 2× symbol. By contrast, DC Option 2 (e.g., row 3) assumes that a new notch filter that is sharper and with a narrower notch may be used (as compared with the notch filter used in 802.11ac) such that only three DC tone are needed in the tone plan of the modified LTF symbol with a 2× symbol duration. Unlike the DC Option 2 in FIG. 3A, the DC Option 2 in FIG. 3B assumes a slightly wider notch filter.

Referring to FIG. 3B, assuming a wireless network (e.g., the wireless network in FIGS. 1, 2) uses symbols with a 2× symbol duration, row 1 of the diagram illustrates the usable tone indices for a 20 MHz symbol, a 40 MHz symbol, and an 80 MHz symbol. For example, a 20 MHz symbol with a 4× symbol duration has usable tones over the tone indices range of [−122:−2] and [2:122]. In this example, the valid start tone index is −122 and the valid end tone index is 122. The guard tones are located at tone indices [−128:−123] and [123:127]. The DC tones are located at tone indices [−1:1]. In another example, a 40 MHz symbol with a 4× symbol duration has usable tones over the tone indices range of [−250:−130], [−126:−6], [6:126], and [130:250]. In this example, the valid start tone index is −250 and the valid end tone index is 250. In another example, an 80 MHz symbol with a 4× symbol duration has usable tones over the tone indices range of [−506:−4] and [4:506]. In this example, the valid start tone index is −506 and the valid end tone index is 506. To compress the symbols with 4× symbol duration in row 1 into a symbol with 2× symbol duration, the valid start tone index and the valid end tone index for the 20 MHz symbol, with 2× symbol duration and a modified tone plan, may be a function of the valid start and end tone indices for the symbols in row 1 divided by 2. In one example, as shown in row 1, for a 20 MHz LTF symbol with a 4× symbol duration, the usable tones are [−122:−2] and [2:122]. For LTF compression, the valid start tone index in a 20 MHz LTF symbol with a 2× symbol duration may be equal to −61. Similarly, the valid end tone index in the 20 MHz LTF symbol with a 2× symbol duration may be equal to 61. As such, the 20 MHz LTF symbols with 2× symbol duration in rows 2 and 3 both have tone plans with valid start and end tone indices of −61 and 61, respectively. The remaining determination for the tone plan is the number of DC tones. In DC Option 1, row 2, the assumption is that an existing notch filter (e.g., used in 802.11ac products) is used and thus the number of DC tones may be based on the tone plans for symbols having 1× symbol duration at the various frequency bandwidths to prevent tone cut-off. In DC Option 1, the existing tone plan (e.g., in IEEE 802.11ac) for a 20 MHz symbol with 1× symbol duration calls for one DC tone. As such, three DC tone indices −1, 0, 1 may be reserved for a 2× symbol duration. In DC Option 2, one assumes that a narrower notch filter, and thus, only three DC tones may be needed regardless of the number of DC tones in the 1× symbol duration. As such, tone indices −1, 0, and 1 may be reserved for the 2× symbol duration. In sum, the usable tone indices for a modified tone plan for a 20 MHz LTF symbol with a 2× symbol duration may have usable tone indices of [−61:−2] and [2:61] for DC Option 1 and DC Option 2.

In another example, as shown in row 1, for a 40 MHz LTF symbol with a 4× symbol duration, the usable tones are [−250:−130], [−126:−6], [6:126], and [130:250]. For LTF compression, the valid start tone index in a 40 MHz LTF symbol, with a 2× symbol duration and a modified tone plan, may be equal to −125. Similarly, the valid end tone index in the 40 MHz LTF symbol with a 2× symbol duration may be equal to 125. Referring to FIG. 3B, the 40 MHz LTF symbols with 2× symbol duration in rows 2 and 3 both have valid start and end tone indices of −125 and 125, respectively. The remaining determination is the number of DC tones. Assuming the same notch filter assumptions apply as discussed with respect to the 20 MHz symbol, in DC Option 1, the existing tone plan for a 40 MHz symbol with 1× symbol duration calls for three DC tones. As such, tone indices −2, −1, 0, 1, and 2 may be reserved for the DC tones. In DC Option 2, one assumes that a narrower notch filter may be used, and thus, only three DC tone may be used. As such, tone indices −1, 0, and 1 may be reserved for the DC tones. In sum, the usable tone indices for a modified tone plan for a 40 MHz LTF symbol with a 2× symbol duration may have usable tone indices of [−125:−3] and [3:125] for DC Option 1 and [−125:−2] and [2:125] for DC Option 2.

In yet another example, as shown in row 1, for an 80 MHz LTF symbol with a 4× symbol duration, the usable tones are [−506:−4] and [4:506]. For LTF compression, the valid start tone index in an 80 MHz LTF symbol, with a 2× symbol duration and a modified tone plan, may be equal to −253. Similarly, the valid end tone index in the 80 MHz LTF symbol with a 2× symbol duration may be equal to 253. Referring to FIG. 3B, the modified tone plan for 80 MHz LTF symbols with 2× symbol duration in rows 2 and 3 both have valid start and end tone indices of −253 and 253, respectively. The remaining determination is the number of DC tones. Assuming the same notch filter assumptions apply as discussed with respect to the 20 MHz symbol, in DC Option 1, the existing tone plan for an 80 MHz symbol with 2× symbol duration may have three DC tones. As such, tone indices −2, −1, 0, 1, and 2 may be reserved for the DC tones. In DC Option 2, one assumes that a narrower notch filter may be used, and thus, only three DC tone may be used. As such, tone indices −1, 0, and 1 may be reserved for the DC tones. In sum, the usable tone indices for a modified tone plan for an 80 MHz LTF symbol with a 2× symbol duration may have usable tone indices of [−253:−3] and [3:253] for DC Option 1 and [−253:−2] and [2:253] for DC Option 2.

The aforementioned examples with respect to rows 2 and 3 of FIG. 3B illustrate how the valid start and end tone indices for usable tones, along with DC tone indices, may be calculated for a modified tone plan in an LTF symbol with a 2× symbol duration from an existing tone plan of an LTF symbol with a 4× symbol duration. A modified LTF symbol allows for reduced LTF symbol overhead compared to LTF symbols with 4× symbol duration. In an aspect, the modified tone plans in rows 2 and 3 of FIG. 3B may be preconfigured (e.g., hard-coded in a STA or an AP).

In sum, an AP or a STA may transmit frames containing LTF symbols with the modified tone plans while using symbols with 4× symbol duration for data. For example, AP (e.g., AP 202) may transmit to a STA (e.g., STA 206) user data in a 20 MHz data symbol (e.g., the data symbol 268), in which the 20 MHz data symbol has a 4× symbol duration and a usable tone indices range of [−122:2] and [2:122]. Additionally, for channel estimation purposes, the AP may transmit to the STA an LTF (or at least part of an LTF) in a 20 MHz LTF symbol (e.g., the LTF symbol 266), in which the 20 MHz LTF symbol has a 2× symbol duration and a usable tone indices range of [−61:2] and [2:61].

In another embodiment, FIG. 3C illustrates an existing LTF symbol with a 4× symbol duration (row 1) that is used to derive a modified tone plan for LTF symbols with a 1× symbol duration (rows 2, 3). In an aspect, the tone plans in rows 2, 3 may be derived from the tone plan in row 1 by performing a 4× downscaling of the usable tones in row 1. That is, every fourth tone of a tone plan in row 1 may be populated onto the tone plans in rows 2, 3.

20 MHz—Option 1

In one example, row 1 illustrates a 20 MHz symbol with a 4× symbol duration that has usable tones [−122:−2] and [2:122]. The tones in an LTF symbol with a 4× symbol duration may be downscaled such that every fourth tone of a symbol with a 4× symbol duration is mapped to an LTF symbol with a 1× symbol duration, such that the LTF symbol with a 1× symbol duration would have valid start and end tone indices determined based the following expression:

$$\frac{\left[4\times \text{ValidStartIndex}4:\text{DCLeftIndex}-1\right] \cup \left[\text{DCRightIndex}+1:4\times\text{ValidEndIndex}\right]}{4}-0.5$$

The above equation represents inputs used to derive a range of tone indices for a symbol of 1× symbol duration. The 4×ValidStartIndex is the valid start tone index for a symbol with a 4× symbol duration, the DCLeftIndex is a left-most DC tone index of the symbol, the DCRightIndex is a right-most DC tone index of the symbol, and the 4×ValidEndIndex is the valid end tone index for the symbol. The value "4" between the 4×ValidStartIndex and DCLeftIndex and between the DCRightIndex and 4×ValidEndIndex indicates that every fourth tone of a symbol with a 4× symbol duration is mapped to the LTF symbol with a 1× symbol duration. The DCLeftIndex−1 represents the first tone index to the left of the DCLeftIndex, and the DCRightIndex+1 represents the first tone index to the right of the DCRightIndex. The value, −0.5, is used for mapping the LTF signal on an integer numbered tone index.

This approach reduces extrapolation for 4× tones. Continuing with the example, the tone indices for a symbol with a 1× symbol duration may be populated at tone indices [−30.5:30.5], determined based on {[−122:4:−2] U [2:4:122]}/4. In this case, every fractional tone index separated by a tone index spacing of 1 is populated (e.g., −30.5, −29.5, −28.5, . . . , 30.5). To map the fractional tone indices to integer tone indices for purpose of packing the LTF symbol, the tone indices may be shifted by −0.5 (a half tone downward) to derive the tone indices in row 2 of FIG. 3C. As such, the tone indices to be packed include the range [−31:30], in which {[−122:4:−2] U [2:4:122]}/4−0.5=[−31:30]. In this example, the integer tone indices include a DC tone, and therefore, the DC tone is also packed. To avoid transmitting on a DC tone (tone index 0), after packing the LTF symbol (e.g., inserting information into the LTF symbol at the various tone indices), the [−31:30] tone index may be shifted by +0.5 (a half tone upward shift, corresponding to a time domain phase ramp) to generate transmission signals on tones of [−31:30]+0.5=[−30.5:30.5]. Additionally, the half tone shift enables the transmission to occur on the exact frequency instants of [4×ValidStartIndex:4:DCLeftIndex−1 DCRightIndex+1:4:4×ValidEndToneIndex]/4. After this shift, signals are transmitted at tone indices −30.5, −29.5, −28.5, . . . , 29.5, 30.5, in which each tone index is separate by a value of 1. Transmission on tone index 0 (DC tone) is avoided.

40 MHz—Option 1

In another example, row 1 illustrates a 40 MHz symbol with a 4× symbol duration that has usable tones [−250:−130], [−126:−6], [6:126], and [130:250]. The tones in an LTF symbol with a 4× symbol duration may be downscaled such that every fourth tone of a symbol with a 4× symbol duration is mapped to an LTF symbol with a 1× symbol duration, such that the LTF symbol with a 1× symbol duration would have valid start and end tone indices determined based the following expression:

$$\frac{\mathrm{U}\left[\begin{matrix}[4\times\mathrm{ValidStartIndex}4{:}\mathrm{DCLeftIndex}-1]\\ \mathrm{DCRightIndex}+1{:}4{:}4\mathrm{xValidEndIndex}\end{matrix}\right]}{4}-0.5$$

The 4×ValidStartIndex is the valid start tone index for a symbol with a 4× symbol duration, the DCLeftIndex is a left-most DC tone index of the symbol, the DCRightIndex is a right-most DC tone index of the symbol, and the 4×ValidEndIndex is the valid end tone index for the symbol. The value "4" between the 4×ValidStartIndex and DCLeftIndex and between the DCRightIndex and 4×ValidEndIndex indicates that every fourth tone of a symbol with a 4× symbol duration is mapped to the LTF symbol with a 1× symbol duration. The DCLeftIndex−1 represents the first tone index to the left of the DCLeftIndex, and the DCRightIndex+1 represents the first tone index to the right of the DCRightIndex. The value, −0.5, is used for mapping the LTF signal on an integer numbered tone index.

This approach reduces extrapolation for 4× tones. Continuing with the example, the tone indices for a symbol with a 1× symbol duration may be populated at tone indices [−62.5:−1.5] U [1.5:62.5], determined based on {[−250:4:−130] U [−126:4:−6] U [6:4:126] U [130:4:250]}/4. In this case, almost every fractional tone index separated by a tone index spacing of 1 is populated (e.g., −62.5, −61.5, −60.5, . . . , −1.5, 1.5, 2.5, . . . , 62.5). To map the fractional tone indices to integer tone indices for purpose of packing the LTF symbol, the tone indices may be shifted by −0.5 (a half tone downward) to derive the tone indices in row 2. As such, {[−250:4:−130] U [−126:4:−6] U [6:4:126] U [130:4:250]}/4−0.5=[−63:−2] U [1:62]. Subsequently, the [−63:−2] U [1:62] tone indices may be shifted by +0.5 (a half tone upward shift, corresponding to a time domain phase ramp) to generate transmission signals on tones of [−62:−2] U [1:62]+0.5=[−61.5:−1.5] U [1.5:62.5]. The half tone shift enables the transmission to occur on the exact frequency instants of [4×ValidStartIndex:4:DCLeftIndex−1 DCRightIndex+1:4:4×ValidEndToneIndex]/4. After this shift, signals are transmitted at tone indices −61.5, −60.5, −59.5, . . . , −1.5, 1.5, 2.5, . . . , 62.5, in which each tone index is separate by a value of 1. Transmission on tone index 0 (DC tone) is avoided.

80 MHz—Option 1

In another example, row 1 illustrates an 80 MHz symbol with a 4× symbol duration that has usable tones [−506:−2], [2:506]. The tones in an LTF symbol with a 4× symbol duration may be downscaled such that every fourth tone of a symbol with a 4× symbol duration is mapped to an LTF symbol with a 1× symbol duration, such that the LTF symbol with a 1× symbol duration would have valid start and end tone indices determined based the following expression:

$$\frac{\mathrm{U}\left[\begin{matrix}[4\times\mathrm{ValidStartIndex}4{:}\mathrm{DCLeftIndex}-1]\\ \mathrm{DCRightIndex}+1{:}4{:}4\mathrm{xValidEndIndex}\end{matrix}\right]}{4}-0.5$$

The 4×ValidStartIndex is the valid start tone index for a symbol with a 4× symbol duration, the DCLeftIndex is a left-most DC tone index of the symbol, the DCRightIndex is a right-most DC tone index of the symbol, and the 4×ValidEndIndex is the valid end tone index for the symbol. The value "4" between the 4×ValidStartIndex and DCLeftIndex and between the DCRightIndex and 4×ValidEndIndex indicates that every fourth tone of a symbol with a 4× symbol duration is mapped to the LTF symbol with a 1× symbol duration. The DCLeftIndex−1 represents the first tone index to the left of the DCLeftIndex, and the DCRightIndex+1 represents the first tone index to the right of the DCRightIndex. The value, −0.5, is used for mapping the LTF signal on an integer numbered tone index.

This approach reduces extrapolation for 4× tones. Continuing with the example, the tone indices for a symbol with a 1× symbol duration may be populated at tone indices [−126.5:126.5], determined based on {[−506:4:−2] U [2:4:506]}/4. In this case, every fractional tone index separated by a tone index spacing of 1 is populated (e.g., −126.5, −125.5, −124.5, . . . , 126.5). To map the fractional tone indices to integer tone indices for purpose of packing the LTF symbol, the tone indices may be shifted by −0.5 (a half tone downward) to derive the tone indices in row 2. As such, the tone indices to be packed include the range [−127:126], in which {[−504:4:−2] U [2:4:506]}/4−0.5=[−127:126]. In this example, the integer tone indices include at least one DC tone, and therefore, at least one DC tone is also packed. To avoid actually transmitting on the DC tone, the [−127:126] tone indices may be shifted by +0.5 (a half tone upward shift, corresponding to a time domain phase ramp) to generate transmission signals on tones of [−127:126]+0.5=[−126.5:126.5]. The half tone shift enables the transmission to occur on the exact frequency instants of [4×ValidStartIndex:4:DCLeftIndex−1 DCRightIndex+1:4:4×ValidEndToneIndex]/4. After this shift, signals are transmitted at tone indices −126.5, −125.5, −124.5, . . . , 126.5, in which each tone index is separate by a value of 1. Transmission on tone index 0 (DC tone) is also avoided.

20 MHz—Option 2

In one example, row 1 illustrates a 20 MHz symbol with a 4× symbol duration that has usable tones [−122:−2] and [2:122]. The tones in an LTF symbol with a 4× symbol duration may be downscaled such that every fourth tone of a symbol with a 4× symbol duration is mapped to an LTF symbol with a 1× symbol duration, such that the LTF symbol with a 1× symbol duration would have valid start and end tone indices determined based the following expression:

$$\frac{[4\times \text{ValidStartIndex}4:\text{DCLeftIndex}-1]\ \text{U}[\text{DCRightIndex}+1:4:4\text{xValidEndIndex}]}{4}+0.5$$

The 4×ValidStartIndex is the valid start tone index for a symbol with a 4× symbol duration, the DCLeftIndex is a left-most DC tone index of the symbol, the DCRightIndex is a right-most DC tone index of the symbol, and the 4×ValidEndIndex is the valid end tone index for the symbol. The value "4" between the 4×ValidStartIndex and DCLeftIndex and between the DCRightIndex and 4×ValidEndIndex indicates that every fourth tone of a symbol with a 4× symbol duration is mapped to the LTF symbol with a 1× symbol duration. The DCLeftIndex−1 represents the first tone index to the left of the DCLeftIndex, and the DCRightIndex+1 represents the first tone index to the right of the DCRightIndex. The value, +0.5, is used for mapping the LTF signal on an integer numbered tone index.

This approach reduces extrapolation for 4× tones. Continuing with the example, the tone indices for a symbol with a 1× symbol duration may be populated at tone indices [−30.5:30.5], determined based on {[−122:4:−2] U [2:4:122]}/4. In this case, every fractional tone index separated by a tone index spacing of 1 is populated (e.g., −30.5, −29.5, −28.5, . . . , 30.5). To map the fractional tone indices to integer tone indices for purpose of packing the LTF symbol, the tone indices may be shifted by +0.5 (a half tone upward) to derive the tone indices in row 3 of FIG. 3C. As such, {[−122:4:−2] U [2:4:122]}/4+0.5=[−30:31]. In this example, the integer tone indices include a DC tone. To avoid transmitting on a DC tone (tone index 0), after packing the LTF symbol (e.g., inserting information into the LTF symbol at the various tone indices), the [−30:31] tone index may be shifted by −0.5 (a half tone downward shift, corresponding to a time domain phase ramp) to generate transmission signals on tones of [−30:31]−0.5=[−30.5:30.5]. Additionally, the half tone shift enables the transmission to occur on the exact frequency instants of [4×ValidStartIndex:4:DCLeftIndex−1 DCRightIndex+1:4:4×ValidEndToneIndex]/4. After this shift, signals are transmitted at tone indices −30.5, −29.5, −28.5, . . . , 29.5, 30.5, in which each tone index is separate by a value of 1. Transmission on tone index 0 (DC tone) is avoided.

40 MHz—Option 2

In another example, row 1 illustrates a 40 MHz symbol with a 4× symbol duration that has usable tones [−250:−130], [−126:−6], [6:126], and [130:250]. The tones in an LTF symbol with a 4× symbol duration may be downscaled such that every fourth tone of a symbol with a 4× symbol duration is mapped to an LTF symbol with a 1× symbol duration, such that the LTF symbol with a 1× symbol duration would have valid start and end tone indices determined based the following expression:

$$\frac{[4\times \text{ValidStartIndex}4:\text{DCLeftIndex}-1]\ \text{U}[\text{DCRightIndex}+1:4:4\text{xValidEndIndex}]}{4}+0.5$$

The 4×ValidStartIndex is the valid start tone index for a symbol with a 4× symbol duration, the DCLeftIndex is a left-most DC tone index of the symbol, the DCRightIndex is a right-most DC tone index of the symbol, and the 4×ValidEndIndex is the valid end tone index for the symbol. The value "4" between the 4×ValidStartIndex and DCLeftIndex and between the DCRightIndex and 4×ValidEndIndex indicates that every fourth tone of a symbol with a 4× symbol duration is mapped to the LTF symbol with a 1× symbol duration. The DCLeftIndex−1 represents the first tone index to the left of the DCLeftIndex, and the DCRightIndex+1 represents the first tone index to the right of the DCRightIndex. The value, +0.5, is used for mapping the LTF signal on an integer numbered tone index.

This approach reduces extrapolation for 4× tones. Continuing with the example, the tone indices for a symbol with a 1× symbol duration may be populated at tone indices [−62.5:−1.5] U [1.5:62.5], determined based on {[−250:4:−130] U [−126:4:−6] U [6:4:126] U [130:4:250]}/4. In this case, almost every fractional tone index separated by a tone index spacing of 1 is populated (e.g., −62.5, −61.5, −60.5, . . . , −1.5, 1.5, 2.5, . . . , 62.5). To map the fractional tone indices to integer tone indices for purpose of packing the LTF symbol, the tone indices may be shifted by +0.5 (a half tone upward) to derive the tone indices in row 3 of FIG. 3C. As such, {[−250:−4:130] U [−126:4:−6] U [6:4:126] U [130:4:250]}/4+0.5=[−62:−1] U [2:63]. Subsequently, the [−62:−1] U [2:63] tone indices may be shifted by −0.5 (a half tone downward shift, corresponding to a time domain phase ramp) to generate transmission signals on tones of [−62:−1] U [2:63]−0.5=[−62.5:−1.5] U [1.5:62.5]. The half tone shift enables the transmission to occur on the exact frequency instants of [4×ValidStartIndex:4:DCLeftIndex−1 DCRightIndex+1:4:4×ValidEndToneIndex]/4. After this shift, signals are transmitted at tone indices −62.5, −61.5, −60.5, . . . , −1.5, 1.5, 2.5, . . . , 62.5, in which each tone index is separate by a value of 1. Transmission on tone index 0 (DC tone) is avoided.

80 MHz—Option 2

In another example, row 1 illustrates an 80 MHz symbol with a 4× symbol duration that has usable tones [−506:−2], [2:506]. The tones in an LTF symbol with a 4× symbol duration may be downscaled such that every fourth tone of a symbol with a 4× symbol duration is mapped to an LTF symbol with a 1× symbol duration, such that the LTF symbol with a 1× symbol duration would have valid start and end tone indices determined based the following expression:

$$\frac{[4\times \text{ValidStartIndex}4:\text{DCLeftIndex}-1]\ \text{U}[\text{DCRightIndex}+1:4:4\text{xValidEndIndex}]}{4}+0.5$$

The 4×ValidStartIndex is the valid start tone index for a symbol with a 4× symbol duration, the DCLeftIndex is a left-most DC tone index of the symbol, the DCRightIndex is a right-most DC tone index of the symbol, and the 4×ValidEndIndex is the valid end tone index for the symbol. The value "4" between the 4×ValidStartIndex and DCLeftIndex and between the DCRightIndex and 4×ValidEndIndex indicates that every fourth tone of a symbol with a 4× symbol duration is mapped to the LTF symbol with a 1× symbol duration. The DCLeftIndex−1 represents the first tone index to the left of the DCLeftIndex, and the DCRightIndex+1 represents the first tone index to the right of the DCRightIndex. The value, +0.5, is used for mapping the LTF signal on an integer numbered tone index.

This approach reduces extrapolation for 4× tones. Continuing with the example, the tone indices for a symbol with a 1× symbol duration may be populated at tone indices [−126.5:126.5], determined based on {[−506:4:−2] U [2:4:

506]}/4. In this case, every fractional tone index separated by a tone index spacing of 1 is populated (e.g., −126.5, −125.5, −124.5, . . . , 126.5). To map the fractional tone indices to integer tone indices for purpose of packing the LTF symbol, the tone indices may be shifted by +0.5 (a half tone upward) to derive the tone indices in row 3. As such, {[−504:4:−2] U [2:4:506]}/4+0.5=[−126:127]. Subsequently, the [−126:127] tone indices may be shifted by −0.5 (a half tone downward shift, corresponding to a time domain phase ramp) to generate transmission signals on tones of [−126:127]−0.5=[−126.5:126.5]. The half tone shift enables the transmission to occur on the exact frequency instants of [4×ValidStartIndex:4:DCLeftIndex−1 DCRightIndex+1:4:4×ValidEndToneIndex]/4. After this shift, signals are transmitted at tone indices −126.5, −125.5, −124.5, . . . , 126.5, in which each tone index is separate by a value of 1. Transmission on tone index 0 (DC tone) is also avoided.

Based on the tone plans in row 2, for example, the STA 206 may use a 20 MHz LTF symbol with 1× symbol duration having tone indices [−31:30] to transmit the LTF. The LTF symbol may be packed at tone indices [−31:30] based on downsampled signals associated with a 20 MHz 4×LTF symbol. After packing the 20 MHz 1×LTF symbol, the STA may transmit information (e.g., LTF information) in the 20 MHz 1×LTF symbol with half tone upward shift (e.g., [−30.5:30.5]). The 20 MHz LTF 1× symbol may be received by the AP 202, for example. In one configuration, the AP 202 may perform an inverse phase ramp to associate the received signals in the LTF symbol with integer tone indices (e.g., perform inverse phase ramp by −0.5 to go from [−30.5:30.5] to [−31:30]). Afterwards, the AP 202 may perform a 1×FFT to retrieve the LTF signals on integer tone indices on 1× tones. In another configuration, the AP 202 may avoid the inverse phase ramp by directly oversampling (e.g., using 2×/4×FFT), to map the received signal to appropriate tone indices in 2× or 4× symbol tones. Although this example uses a STA as the transmitter and an AP as the receiver, the AP may be the transmitter and the STA may be the receiver. This operation/procedure also applies to the tone plans in row 3.

FIGS. 4A-B are exemplary diagrams 400, 450 of tone plans/indices for LTF compression. However, instead of modifying the tone plan for an LTF symbol with 1× or 2× symbol duration at the various frequency bandwidths (e.g., 20 MHz, 40 MHz, 80 MHz) as shown in FIGS. 3A-B, another option is to use an existing tone plan for an LTF symbol with a 1× or 2× symbol duration (e.g., per IEEE 802.11ac) and modify the tone plan for data symbols with a 4× symbol duration. For example, as shown in row 1 of FIG. 4A, a 20 MHz symbol with a 1× symbol duration has usable tones over the tone indices range of [−28:−1] and [1:28]. A 40 MHz symbol with a 1× symbol duration has usable tones over the tone indices range of [−58:−2] and [2:58]. And an 80 MHz symbol with a 1× symbol duration has usable tones over the tone indices range of [−122:−2] and [2:122]. Based on the existing tone plans in row 1, corresponding tone plans for a data symbol with a 4× symbol duration may be determined by multiplying the valid start and end indices of the tone plan for an LTF symbol at 1× symbol duration by 4. In one example, for a 20 MHz LTF symbol with a 1× symbol duration, the tone plan has usable tones at tone indices [−28:−1] and [1:28] (e.g., as per IEEE 802.11n and 802.11ac). To ease the reconstruction of channel estimates in a data symbol with a 4× symbol duration, the valid start tone index in the data symbol (e.g., the data symbol 268) may be determined by −28*4=−112, and the valid end tone index may be determined by 28*4=112. With respect to the DC tones in a data symbol with a 4× symbol duration, the DC tones may not need to be 4 times the number of DC tones as in the tone plan for a symbol of 1× symbol duration. Instead, if a symbol of 1× symbol duration has 1 DC tone, the corresponding data symbol of 4× symbol duration may have 3-4 DC tones to provide the same frequency width for notch filtering. And if a symbol of 1× symbol duration has 3 DC tones, the corresponding data symbol of 4× symbol duration may have 7-8 DC tones. As shown in row 1, the 20 MHz data symbol of 1× symbol duration has one DC tone. As such, as shown in row 2, the 20 MHz data symbol of 4× symbol duration may have 3 DC tones, and therefore, the modified tone plan may have usable tone indices ranging from [−112:−2] and [2:112]. The total number of usable tones is equal to the valid end tone index minus the valid start tone index plus one minus the number of DC tones. The total number of usable tones will be split into data tones and pilot tones. In one aspect, this tone plan may have 210 data tones and 12 pilot tones for a total of 222 usable tones.

In another example, for a 40 MHz LTF symbol with a 1× symbol duration, the tone plan has usable tones at tone indices [−58:−2] and [2:58] (e.g., as per wireless standards IEEE 802.11n and 802.11ac). To ease the reconstruction of channel estimates in a data symbol with a 4× symbol duration, the valid start tone index in the data symbol may be determined by −58*4=−232, and the valid end tone index may be determined by 58*4=232. With respect to the DC tones in a 40 MHz data symbol with a 1× symbol duration, there are 3 DC tones. As such, as shown in row 2, the 40 MHz data symbol of 4× symbol duration may have 7 DC tones, and therefore, the modified tone plan may have usable tone indices ranging from [−232:−4] and [4:232]. In one aspect, this tone plan may have 444 data tones and 14 pilot tones for a total of 458 usable tones.

In yet another example, for an 80 MHz LTF symbol with a 1× symbol duration, the tone plan has usable tones at tone indices [−122:−2] and [2:122] (e.g., as per IEEE 802.11n and 802.11ac). To ease the reconstruction of channel estimates in a data symbol with a 4× symbol duration, the valid start tone index in the data symbol may be determined by −122*4=−488, and the valid end tone index may be determined by 122*4=488. With respect to the DC tones in an 80 MHz data symbol with a 1× symbol duration, there are 3 DC tones. As such, as shown in row 2, the 80 MHz data symbol of 4× symbol duration may have 7 DC tones, and therefore, the modified tone plan may have usable tone indices ranging from [−488:−4] and [4:488]. In one aspect, this tone plan may have 954 data tones and 16 pilot tones for a total of 970 usable tones.

In another embodiment, as shown in row 1 of FIG. 4B, a 20 MHz symbol with a 2× symbol duration has usable tones over the tone indices range of [−58:−2] and [2:58]. A 40 MHz symbol with a 2× symbol duration has usable tones over the tone indices range of [−122:−2] and [2:122]. And an 80 MHz symbol with a 2× symbol duration has usable tones over the tone indices range of [−250:−3] and [3:250]. Based on the existing tone plans in row 1 of FIG. 4B, corresponding tone plans for a data symbol with a 4× symbol duration may be determined by multiplying the valid start and end indices of the tone plan for an LTF symbol at 2× symbol duration by 2. In one example, for a 20 MHz LTF symbol with a 2× symbol duration, the tone plan has usable tones at tone indices [−58:−2] and [2:58] (e.g., as per IEEE 802.11n and 802.11ac). To ease the reconstruction of channel estimates in a data symbol with a 4× symbol duration, the valid start tone index in the data symbol (e.g., the data symbol 268) may be determined by −58*2=−116, and the valid end tone index may be determined by 58*2=116. With respect to the DC tones in a data symbol with a 4× symbol duration, the DC tones may not need to be 2 times the number of DC tones as in the tone plan for a symbol of 2× symbol duration. Instead, if a symbol of 2× symbol duration has 3 DC tones, the corresponding data symbol of 4× symbol duration may have 5 DC tones to provide the same frequency width for notch filtering. And if a symbol of 2× symbol duration has 5 DC tones, the corresponding data symbol of 4× symbol duration may have 7 DC tones. As shown in row 1 of FIG. 4B, the 20 MHz data symbol of 1× symbol duration has 3 DC tones. As such, as shown in row 2 of FIG. 4B, the 20 MHz data symbol of 4× symbol duration may have 5 DC tones, and therefore, the modified tone plan may have usable tone indices ranging from [−116:−3] and [3:116]. The total number of usable tones is equal to the valid end tone index minus the valid start tone index plus one minus the number of DC tones. The total number of usable tones will be split into data tones and pilot tones. In one aspect, this tone plan may have 216 data tones and 12 pilot tones for a total of 228 usable tones.

In another example, for a 40 MHz LTF symbol with a 2× symbol duration, the tone plan has usable tones at tone indices [−122:−2] and [2:122] (e.g., as per wireless standards IEEE 802.11n and 802.11ac). To ease the reconstruction of channel estimates in a data symbol with a 4× symbol duration, the valid start tone index in the data symbol may be determined by −122*2=−244, and the valid end tone index may be determined by 122*2=244. With respect to the DC tones in a 40 MHz data symbol with a 2× symbol duration, there are 3 DC tones. As such, as shown in row 2 of FIG. 4B, the 40 MHz data symbol of 4× symbol duration may have 5 DC tones, and therefore, the modified tone plan may have usable tone indices ranging from [−244:−3] and [3:244]. In one aspect, this tone plan may have 468 data tones and 16 pilot tones for a total of 484 usable tones.

In yet another example, for an 80 MHz LTF symbol with a 2× symbol duration, the tone plan has usable tones at tone indices [−250:−3] and [3:250] (e.g., as per IEEE 802.11n and 802.11ac). To ease the reconstruction of channel estimates in a data symbol with a 4× symbol duration, the valid start tone index in the data symbol may be determined by −250*2=−500, and the valid end tone index may be determined by 250*2=250. With respect to the DC tones in an 80 MHz data symbol with a 2× symbol duration, there are 5 DC tones. As such, as shown in row 2 of FIG. 4B, the 80 MHz data symbol of 4× symbol duration may have 7 DC tones, and therefore, the modified tone plan may have usable tone indices ranging from [−500:−4] and [4:500]. In one aspect, this tone plan may have 978 data tones and 16 pilot tones for a total of 994 usable tones.

In sum, an AP or a STA may transmit frames containing LTF information in LTF symbols and user data in data symbols. In one embodiment, the LTF symbols may have a 1× symbol duration and utilize existing tone plans for symbols of 1× symbol duration. The data symbols may utilize a modified tone plan based on an existing tone plan for symbols of 1× symbol duration. In one example, AP (e.g., AP 202) may transmit to a STA (e.g., STA 206) user data in a 20 MHz data symbol (e.g., the data symbol 268), in which the 20 MHz data symbol has a 4× symbol duration and a usable tone indices range of [−112:2] and [2:112]. Additionally, for channel estimation purposes, the AP may transmit to the STA an LTF in a 20 MHz LTF symbol (e.g., the LTF symbol 266), in which the 20 MHz LTF symbol has a 1× symbol duration and a usable tone indices range of [−28:−1] and [1:28].

In another example, the LTF symbols may have a 2× symbol duration and utilize existing tone plans for symbols of 2× symbol duration. The data symbols may utilize a modified tone plan based on an existing tone plan for symbols of 2× symbol duration. For example, AP (e.g., AP 202) may transmit to a STA (e.g., STA 206) user data in a 20 MHz data symbol (e.g., the data symbol 268), in which the 20 MHz data symbol has a 4× symbol duration and a usable tone indices range of [−116:−3] and [3:116]. Additionally, for channel estimation purposes, the AP may transmit to the STA an LTF in a 20 MHz LTF symbol (e.g., the LTF symbol 266), in which the 20 MHz LTF symbol has a 2× symbol duration and a usable tone indices range of [−58:−2] and [2:58].

In yet another example, the LTF symbols may have a modified 2× symbol duration (e.g., in FIGS. 3A-B). The data symbols may utilize an existing tone plan for symbols of 4× symbol duration. For example, the AP (e.g., the AP 202) may transmit to a STA (e.g., STA 206) user data in a 20 MHz data symbol (e.g., the data symbol 268), in which the 20 MHz data symbol has a 4× symbol duration and a usable tone indices range of [−122:−2] and [2:122]. And for channel estimation purposes, among others, the AP may transmit to the STA an LTF in a 20 MHz LTF symbol (e.g., the LTF symbol 266), in which the 20 MHz LTF symbol has a 2× symbol duration and a usable tone indices range of [−61:−2] and [2:61].

Figure 5:
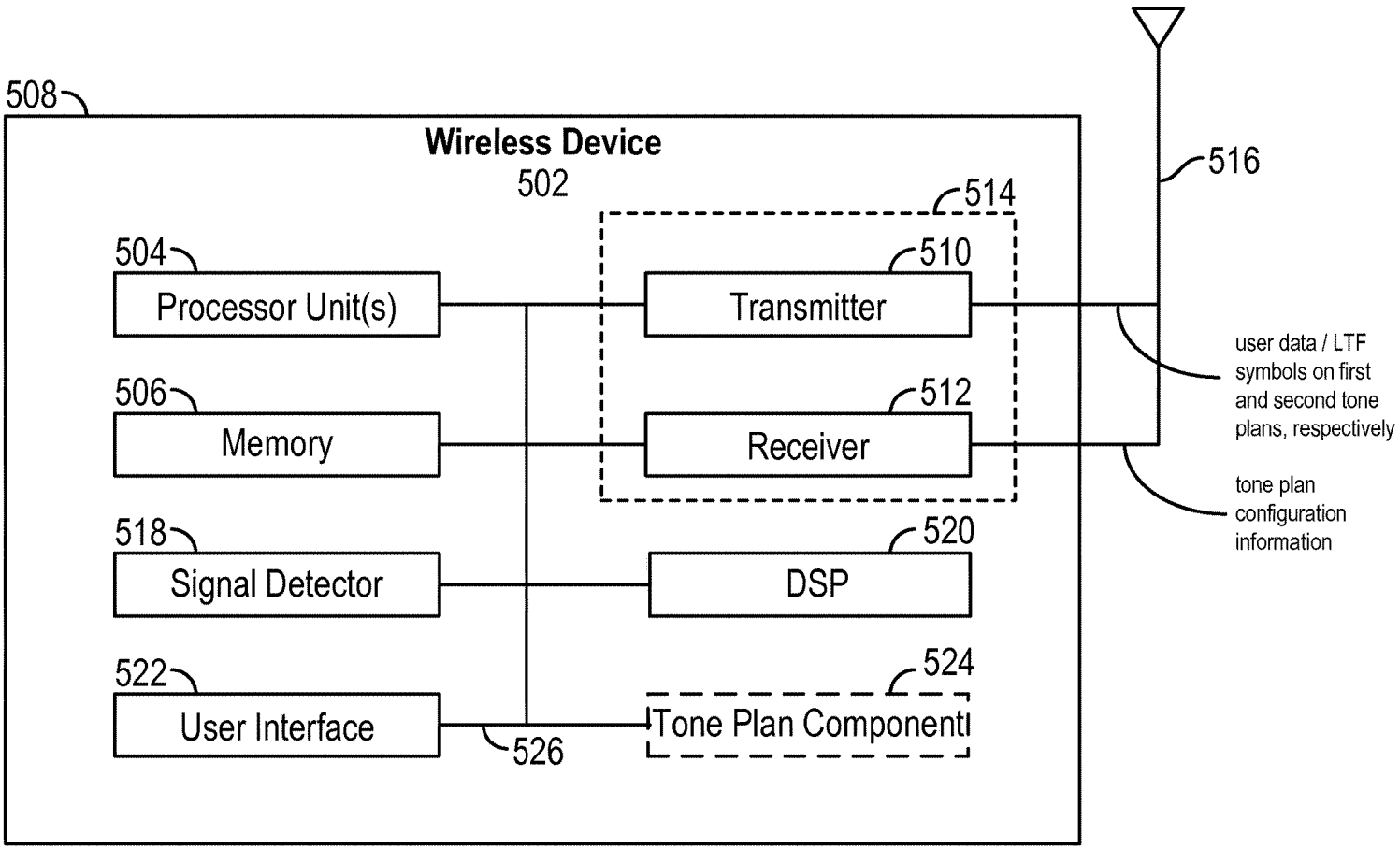
FIG. 5 is a functional block diagram of a wireless device that may be employed within the wireless communication system of FIG. 1 and may use a modified tone plan.

FIG. 5 is a functional block diagram of a wireless device 502 that may be employed within the wireless communication system 100 of FIG. 1 and may use a modified tone plan. The wireless device 502 is an example of a device that may be configured to implement the various methods described herein. For example, the wireless device 502 may be the AP 104, the AP 202, the STAs 112, 114, 116, 118, or the STAs 206, 208, 210, 212.

The wireless device 502 may include a processor 504 which controls operation of the wireless device 502. The processor 504 may also be referred to as a central processing unit (CPU). Memory 506, which may include both read-only memory (ROM) and random access memory (RAM), may provide instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable (by the processor 504, for example) to implement the methods described herein.

The processor 504 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 502 may also include a housing 508, and the wireless device 502 may include a transmitter 510 and/or a receiver 512 to allow transmission and reception of data between the wireless device 502 and a remote device. The transmitter 510 and the receiver 512 may be combined into a transceiver 514. An antenna 516 may be attached to the housing 508 and electrically coupled to the transceiver 514. The wireless device 502 may also include multiple transmitters, multiple receivers, multiple transceivers, and/or multiple antennas.

The wireless device 502 may also include a signal detector 518 that may be used to detect and quantify the level of signals received by the transceiver 514 or the receiver 512. The signal detector 518 may detect such signals as total energy, energy per subcarrier per symbol, power spectral density, and other signals. The wireless device 502 may also include a digital signal processor (DSP) 520 for use in processing signals. The DSP 520 may be configured to generate a packet for transmission. In some aspects, the packet may comprise a PPDU.

The wireless device 502 may further comprise a user interface 522 in some aspects. The user interface 522 may comprise a keypad, a microphone, a speaker, and/or a display. The user interface 522 may include any element or component that conveys information to a user of the wireless device 502 and/or receives input from the user.

When the wireless device 502 is implemented as an AP (e.g., AP 104, AP 202) or as a STA (e.g., the STA 114, the STA 206), the wireless device 502 may also include a tone plan component 524. The tone plan component 524 may be configured to transmit user data, via the transmitter 510 or the transceiver 514, in a first symbol of a first symbol type. The first symbol type may have a first symbol duration, a first frequency bandwidth, and a first tone plan. The first tone plan may have a first valid start tone index, a first valid end tone index, and a first set of DC tones. The tone plan component 524 may be configured to transmit an LTF, via the transmitter 510 or the transceiver 514, in a second symbol of a second symbol type. The second symbol type may have a second symbol duration, a second frequency bandwidth, and a second tone plan. The second tone plan may have a second valid start tone index, a second valid end tone index, and a second set of DC tones. In one configuration, the tone plan component 524 may be configured to determine the first tone plan associated with the first symbol type based on configuration information. In this configuration, the tone plan component 524 may be configured to determine the second tone plan associated with the second symbol type based on the configuration information. In another configuration, the second symbol duration may be less than the first symbol duration. In another configuration, the second valid start tone index is a function of the first valid start tone index, and the second valid end tone index is a function of the first valid end tone index. In another configuration, the first set of DC tones may include three DC tones located at tone indices −1, 0, and 1, and the second set of DC tones may include one DC tone located at tone index 0. In another configuration, the first set of DC tones may include eleven DC tones located at tone indices −5, −4, −3, −2, −1, 0, 1, 2, 3, 4, and 5, and the second set of DC tones may include three DC tones located at tone indices −1, 0, and 1 or one DC tone located at tone index 0. In another configuration, the first set of DC tones may include seven DC tones located at tone indices −3, −2, −1, 0, 1, 2, and 3, and the second set of DC tones may include three DC tones located at tone indices −1, 0, and 1 or one DC tone at tone index 0. In another configuration, the first symbol duration may be four times greater than the second symbol duration, the first and second frequency bandwidths may be 20 megahertz, the first valid start tone index may be −122, the first valid end tone index may be 122, the second valid start tone index may be −31, and the second valid end tone index may be 30. In another configuration, the first symbol duration may be four times greater than the second symbol duration, the first and second frequency bandwidths may be 40 megahertz, the first valid start tone index may be −250, the first valid end tone index may be 250, the second valid start tone index may be −63, and the second valid end tone index may be 62. In another configuration, the first symbol duration may be four times greater than the second symbol duration, the first and second frequency bandwidths may be 80 megahertz, the first valid start tone index may be −506, the first valid end tone index may be 506, the second valid start tone index may be −127, and the second valid end tone index may be 126. In another configuration, transmitting the LTF in the second symbol may include transmitting the LTF in an upshifted subset of tone indices associated with the second symbol and upshifted based on an upshift value. In another configuration, the first symbol duration may be four times greater than the second symbol duration, the first and second frequency bandwidths may be 20 megahertz, the first valid start tone index may be −122, the first valid end tone index may be 122, the second valid start tone index may be −30, and the second valid end tone index may be 31. In this configuration, transmitting the LTF in the second symbol may include transmitting the LTF in a downshifted subset of tone indices associated with the second symbol and downshifted based on a downshift value. In another configuration, the first symbol duration may be four times greater than the second symbol duration, the first and second frequency bandwidths may be 40 megahertz, the first valid start tone index may be −250, the first valid end tone index may be 250, the second valid start tone index may be −62, and the second valid end tone index may be 63. In this configuration, transmitting the LTF in the second symbol may include transmitting the LTF in a downshifted subset of tone indices associated with the second symbol and downshifted based on a downshift value. In another configuration, the first symbol duration may be four times greater than the second symbol duration, the first and second frequency bandwidths may be 80 megahertz, the first valid start tone index may be −506, the first valid end tone index may be 506, the second valid start tone index may be −126, and the second valid end tone index may be 127. In this configuration, transmitting the LTF in the second symbol may include transmitting the LTF in a downshifted subset of tone indices associated with the second symbol and downshifted based on a downshift value. In another configuration, the first symbol duration may be four times greater than the second symbol duration, the first and second frequency bandwidths may be 20 megahertz, the first valid start tone index may be −122, the first valid end tone index may be 122, the second valid start tone index may be −30, and the second valid end tone index may be 30. In another configuration, the first symbol duration may be four times greater than the second symbol duration, the first and second frequency bandwidths may be 40 megahertz, the first valid start tone index may be −250, the first valid end tone index may be 250, the second valid start tone index may be −62, and the second valid end tone index may be 62. In another configuration, the first symbol duration may be four times greater than the second symbol duration, the first and second frequency bandwidths may be 80 megahertz, the first valid start tone index may be −506, the first valid end tone index may be 506, the second valid start tone index may be −126, and the second valid end tone index may be 126. In another configuration, the first set of DC tones may include three DC tones located at tone indices −1, 0, and 1, and the second set of DC tones may include three DC tones located at tone indices −1, 0, and 1. In another configuration, the first set of DC tones may include eleven DC tones located at tone indices −5, −4, −3, −2, −1, 0, 1, 2, 3, 4, and 5, and the second set of DC tones may include five DC tones located at tone indices −2, −1, 0, 1, and 2 or three DC tones located at tone indices −1, 0, and 1. In another configuration, the first set of DC tones may include seven DC tones located at tone indices −3, −2, −1, 0, 1, 2, and 3, and the second set of DC tones may include five DC tones located at tone indices −2, −1, 0, 1, and 2 or three DC tones located at tone indices −1, 0, and 1. In another configuration, the first symbol duration may be two times greater than the second symbol duration, the first and second frequency bandwidths may be 20 megahertz, the first valid start tone index may be −122, the first valid end tone index may be 122, the second valid start tone index may be −61, and the second valid end tone index may be 61. In another configuration, the first symbol duration may be two times greater than the second symbol duration, the first and second frequency bandwidths may be 40 megahertz, the first valid start tone index may be −250, the first valid end tone index may be 250, the second valid start tone index may be −125, and the second valid end tone index may be 125. In another configuration, the first symbol duration may be two times greater than the second symbol duration, the first and second frequency bandwidths may be 80 megahertz, the first valid start tone index may be −506, the first valid end tone index may be 506, the second valid start tone index may be −253, and the second valid end tone index may be 253. In another configuration, the first tone plan may be based on the second tone plan. In one aspect, the first symbol duration may be four times greater than the second symbol duration, the first valid start tone index may be equal to the second valid start tone index multiplied by four, and the first valid end tone index may be equal to the second valid end tone index multiplied by four. In another aspect, the second set of DC tones may include one DC tone, and the first set of DC tones may include three DC tones located at tone indices −1, 0, and 1. In yet another aspect, the second set of DC tones may include three DC tones, and the first set of DC tones may include seven DC tones located at tone indices −3, −2, −1, 0, 1, 2, and 3. In another configuration, the first frequency bandwidth may be 20 megahertz, the first valid start tone index may be −112, and the first valid end tone index may be 112. In another configuration, the first frequency bandwidth may be 40 megahertz, the first valid start tone index may be −232, and the first valid end tone index may be 232. In another configuration, the first frequency bandwidth may be 80 megahertz, the first valid start tone index may be −488, and the first valid end tone index may be 488. In another configuration, the first symbol duration may be two times greater than the second symbol duration, the first valid start tone index may be equal to the second valid start tone index multiplied by two, and the first valid end tone index may be equal to the second valid end tone index multiplied by two. In another configuration, the second set of DC tones may include three DC tones, and the first set of DC tones may include five DC tones located at tone indices −2, −1, 0, 1, and 2. In another configuration, the second set of DC tones may include three DC tones, and the first set of DC tones may include five DC tones located at tone indices −2, −1, 0, 1, and 2. In another configuration, the second set of DC tones may include five DC tones, and the first set of DC tones may include seven DC tones located at tone indices −3, −2, −1, 0, 1, 2, and 3. In another configuration, the first frequency bandwidth may be 20 megahertz, the first valid start tone index may be −116, and the first valid end tone index may be 116. In another configuration, the first frequency bandwidth may be 40 megahertz, and the first valid start tone index may be −244, and the first valid end tone index may be 244. In another configuration, the first frequency bandwidth may be 80 megahertz, the first valid start tone index may be −500, and the first valid end tone index may be 500.

The various components of the wireless device 502 may be coupled together by a bus system 526. The bus system 526 may include a data bus, for example, as well as a power bus, a control signal bus, and a status signal bus in addition to the data bus. Components of the wireless device 502 may be coupled together or accept or provide inputs to each other using some other mechanism.

Although a number of separate components are illustrated in FIG. 5, one or more of the components may be combined or commonly implemented. For example, the processor 504 may be used to implement not only the functionality described above with respect to the processor 504, but also to implement the functionality described above with respect to the signal detector 518, the DSP 520, the user interface 522, and/or the tone plan component 524. Further, each of the components illustrated in FIG. 5 may be implemented using a plurality of separate elements.

Figure 6:
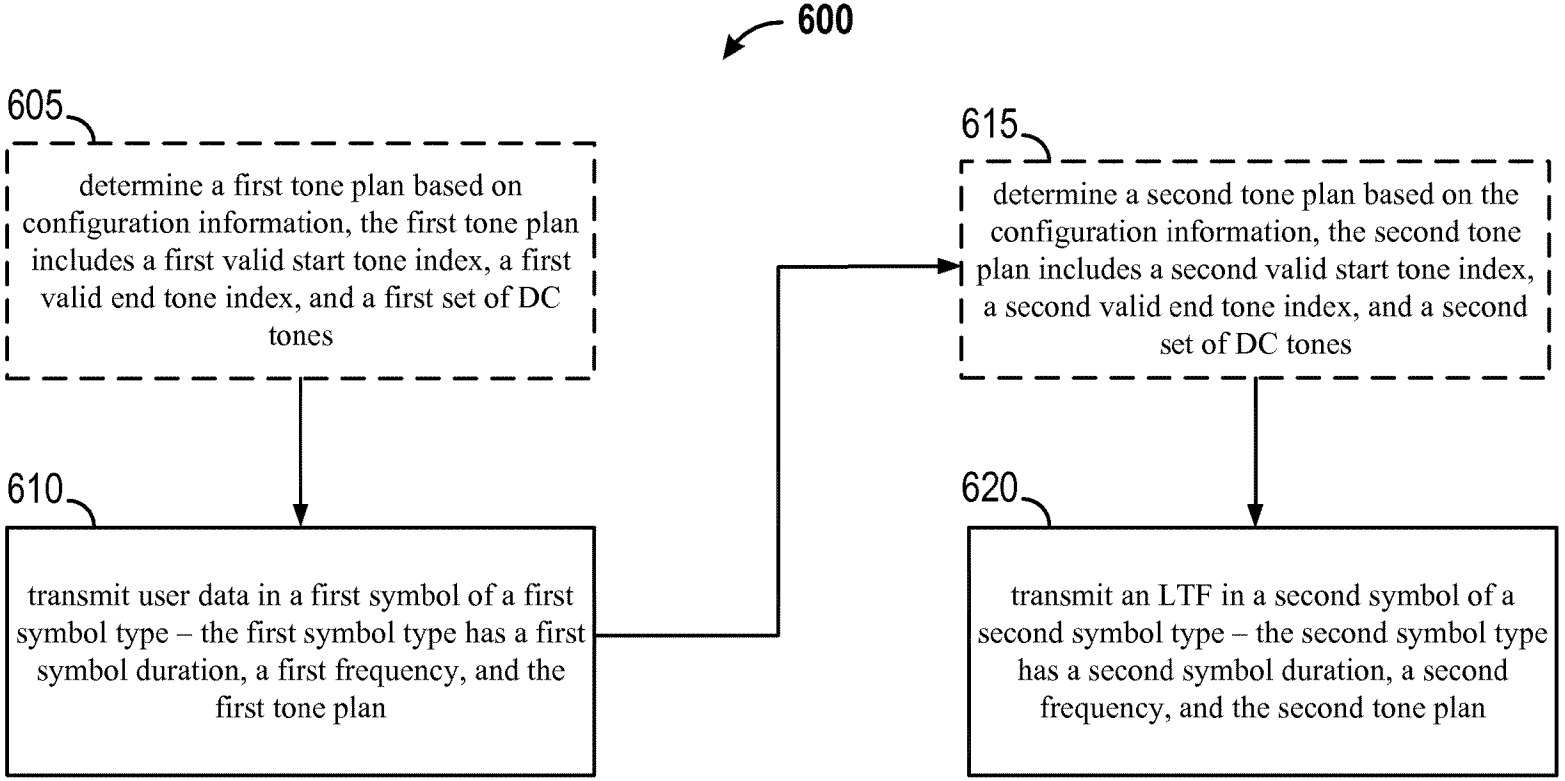
FIG. 6 is a flowchart of an exemplary method of wireless communication using a modified tone plan.

FIG. 6 is a flowchart of an exemplary method 600 of wireless communication using a modified tone plan. The method 600 may be performed using an apparatus (e.g., the AP 104, the AP 202, the STA 114, the STA 206, or the wireless device 502, for example). Although the method 600 is described below with respect to the elements of wireless device 502 of FIG. 5, other components may be used to implement one or more of the steps described herein. In FIG. 6, the blocks indicated with dotted lines represent optional steps.

At block 605, the apparatus may determine a first tone plan associated with a first symbol type based on configuration information, the first symbol duration, and the first frequency bandwidth. The first tone plan may include a first valid start tone index, a first valid end tone index, and a first set of DC tones. For example, referring to FIG. 2, the AP 202 may determine a first tone plan for a data symbol based on configuration information, the first symbol duration, and the first frequency bandwidth. In this example, the AP 202 may choose or be configured to use a 20 MHz symbol (the first frequency) with 4× symbol duration (the first symbol duration) for data symbols. Based on the 20 MHz frequency and the 4× symbol duration, the AP 202 may determine which tone plan to use as indicated by configuration information. For example, the configuration information may indicate a usable tone indices at [−122:−2] U [2:122].

At block 610, the apparatus may transmit user data in a first symbol of a first symbol type. The first symbol type may have a first symbol duration, a first frequency bandwidth, and the first tone plan. For example, referring to FIG. 2, the AP 202 may transmit user data in the first symbol of the first symbol type that has a 4× symbol duration, a 20 MHz bandwidth, and the first tone plan with usable tone indices at [−122:−2] U [2:122]. In an aspect, the user data may be transmitted in the frame 250 within a symbol of the data symbols 268.

At block 615, the apparatus may determine a second tone plan associated with a second symbol type based on the configuration information. The second tone plan may include a second valid start tone index, a second valid end tone index, and a second set of DC tones. For example, referring to FIG. 2, the AP 202 may determine a second tone plan for an LTF symbol based on the configuration information, the second symbol duration, and the second frequency bandwidth. In this example, the AP 202 may choose or be configured to use a 20 MHz symbol (the second frequency) with a 2× symbol duration (the second symbol duration) for LTF symbols. Based on the 20 MHz frequency and the 2× symbol duration, the AP 202 may determine which tone plan to use as indicated by the configuration information. For example, the configuration information may indicate a usable tone index [−61:−1] U [1:61].

At block 620, the apparatus may transmit an LTF in a second symbol of a second symbol type. The second symbol type may have a second symbol duration, a second frequency bandwidth, and the second tone plan. For example, referring to FIG. 2, the AP 202 may transmit the LTF (or part of the LTF) in an LTF symbol of a second symbol type that has a 2× symbol duration, a 20 MHz bandwidth, and the second tone plan with usable tone indices at [−61:−1] U [1:61].

Although the aforementioned examples have been discussed with respect to an AP, a STA may perform similar procedures. For example, the STA 206 may determine a first tone plan based on preconfigured information within the STA 206. In one example, the preconfigured information may indicate that user data is to be transmitted on 20 MHz data symbols (e.g., data symbol 268) with a 4× symbol duration based on a tone plan that has the usable tones within a range of [−122:−2] and [2:122]. The preconfigured information may indicate that the LTF data is to be transmitted on a 20 MHz LTF symbol (e.g., LTF symbol 266) with a 1× symbol duration based on a modified tone plan that has usable tones within a range of [−30:−1] and [1:30]. The STA 206 may transmit user data and LTF data in data symbols and LTF symbols, respectively, according to preconfigured information.

In another example, the preconfigured information may indicate that user data is to be transmitted on 20 MHz data symbols (e.g., data symbol 268) with a 4× symbol duration based on a modified tone plan that has the usable tones within a range of [−112:−2] and [2:112]. The preconfigured information may indicate that the LTF data is to be transmitted on a 20 MHz LTF symbol (e.g., LTF symbol 266) with a 1× symbol duration based on an existing tone plan that has usable tones within a range of [−28:−1] and [1:28]. The STA 206 may transmit user data and LTF data in data symbols and LTF symbols, respectively, according to preconfigured information.

In one example, the preconfigured information may indicate that user data is to be transmitted on 20 MHz data symbols (e.g., data symbol 268) with a 4× symbol duration based on an existing tone plan that has the usable tones within a range of [−122:−2] and [2:122]. The preconfigured information may indicate that the LTF data is to be transmitted on a 20 MHz LTF symbol (e.g., LTF symbol 266) with a 2× symbol duration based on a modified tone plan that has usable tones within a range of [−61:−2] and [2:61]. The STA 206 may transmit user data and LTF data in data symbols and LTF symbols, respectively, according to preconfigured information.

In another example, the preconfigured information may indicate that user data is to be transmitted on 20 MHz data symbols (e.g., data symbol 268) with a 4× symbol duration based on a modified tone plan that has the usable tones within a range of [−116:−3] and [3:116]. The preconfigured information may indicate that the LTF data is to be transmitted on a 20 MHz LTF symbol (e.g., LTF symbol 266) with a 2× symbol duration based on an existing tone plan that has usable tones within a range of [−58:−2] and [2:58]. The STA 206 may transmit user data and LTF data in data symbols and LTF symbols, respectively, according to preconfigured information.

Figure 7:
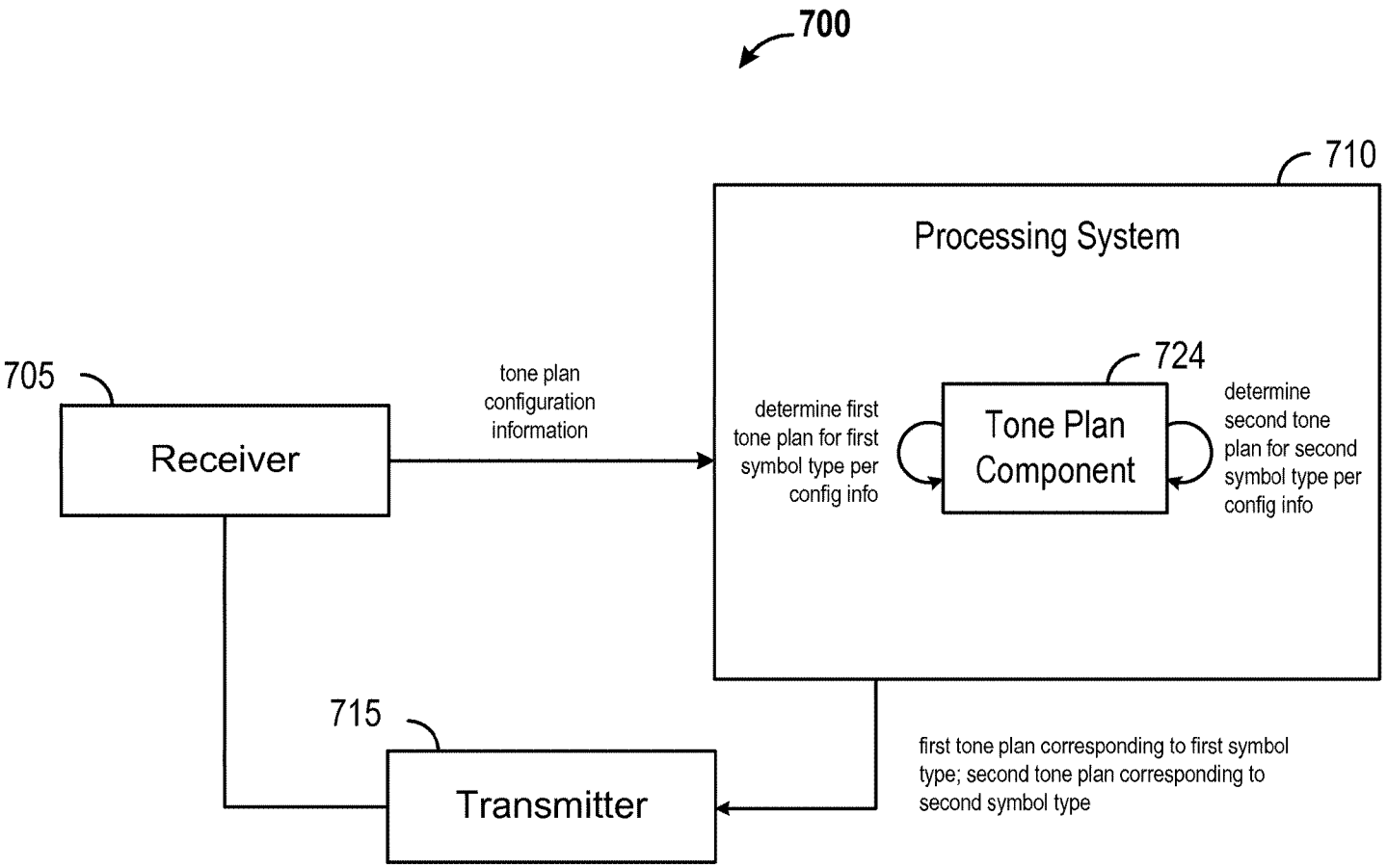
FIG. 7 is a functional block diagram of an exemplary wireless communication device using a modified tone plan.

FIG. 7 is a functional block diagram of an exemplary wireless communication device 700 using a modified tone plan. The wireless communication device 700 may include a receiver 705, a processing system 710, and a transmitter 715. The processing system 710 may include a tone plan component 724. The processing system 710, the tone plan component 724, and/or the transmitter 715 may be configured to transmit user data in a first symbol of a first symbol type. The first symbol type may have a first symbol duration, a first frequency bandwidth, and a first tone plan, and the first tone plan may include a first valid start tone index, a first valid end tone index, and a first set of DC tones. The processing system 710, the tone plan component 724, and/or the transmitter 715 may be configured to transmit an LTF in a second symbol of a second symbol type. The second symbol type may have a second symbol duration, a second frequency bandwidth, and a second tone plan, and the second tone plan may include a second valid start tone index, a second valid end tone index, and a second set of DC tones. In one configuration, the processing system 710 and/or the tone plan component 724 may be configured to determine the first tone plan associated with the first symbol type based on configuration information. In this configuration, the processing system 710 and/or the tone plan component 724 may be configured to determine the second tone plan associated with the second symbol type based on the configuration information. In another configuration, the second symbol duration may be less than the first symbol duration. In another configuration, the second valid start tone index is a function of the first valid start tone index, and the second valid end tone index is a function of the first valid end tone index. In another configuration, the first set of DC tones may include three DC tones located at tone indices −1, 0, and 1, and the second set of DC tones may include one DC tone located at tone index 0. In another configuration, the first set of DC tones may include eleven DC tones located at tone indices −5, −4, −3, −2, −1, 0, 1, 2, 3, 4, and 5, and the second set of DC tones may include three DC tones located at tone indices −1, 0, and 1 or one DC tone located at tone index 0. In another configuration, the first set of DC tones may include seven DC tones located at tone indices −3, −2, −1, 0, 1, 2, and 3, and the second set of DC tones may include three DC tones located at tone indices −1, 0, and 1 or one DC tone at tone index 0. In another configuration, the first symbol duration may be four times greater than the second symbol duration, the first and second frequency bandwidths may be 20 megahertz, the first valid start tone index may be −122, the first valid end tone index may be 122, the second valid start tone index may be −31, and the second valid end tone index may be 30. In another configuration, the first symbol duration may be four times greater than the second symbol duration, the first and second frequency bandwidths may be 40 megahertz, the first valid start tone index may be −250, the first valid end tone index may be 250, the second valid start tone index may be −63, and the second valid end tone index may be 62. In another configuration, the first symbol duration may be four times greater than the second symbol duration, the first and second frequency bandwidths may be 80 megahertz, the first valid start tone index may be −506, the first valid end tone index may be 506, the second valid start tone index may be −127, and the second valid end tone index may be 126. In another configuration, transmitting the LTF in the second symbol may include transmitting the LTF in an upshifted subset of tone indices associated with the second symbol and upshifted based on an upshift value. In another configuration, transmitting the LTF in the second symbol may include inserting LTF information in all tone indices at and between the second valid start tone index and the second valid end tone index, including any tone indices corresponding to DC tones, and transmitting the LTF in an upshifted subset of tone indices associated with the second symbol and upshifted based on an upshift value. In another configuration, the first symbol duration may be four times greater than the second symbol duration, the first and second frequency bandwidths may be 20 megahertz, the first valid start tone index may be −122, the first valid end tone index may be 122, the second valid start tone index may be −30, and the second valid end tone index may be 31. In this configuration, transmitting the LTF in the second symbol may include transmitting the LTF in a downshifted subset of tone indices associated with the second symbol and downshifted based on a downshift value. In another configuration, the first symbol duration may be four times greater than the second symbol duration, the first and second frequency bandwidths may be 40 megahertz, the first valid start tone index may be −250, the first valid end tone index may be 250, the second valid start tone index may be −62, and the second valid end tone index may be 63. In this configuration, transmitting the LTF in the second symbol may include transmitting the LTF in a downshifted subset of tone indices associated with the second symbol and downshifted based on a downshift value. In another configuration, the first symbol duration may be four times greater than the second symbol duration, the first and second frequency bandwidths may be 80 megahertz, the first valid start tone index may be −506, the first valid end tone index may be 506, the second valid start tone index may be −126, and the second valid end tone index may be 127. In this configuration, transmitting the LTF in the second symbol may include transmitting the LTF in a downshifted subset of tone indices associated with the second symbol and downshifted based on a downshift value. In another configuration, the first symbol duration may be four times greater than the second symbol duration, the first and second frequency bandwidths may be 20 megahertz, the first valid start tone index may be −122, the first valid end tone index may be 122, the second valid start tone index may be −30, and the second valid end tone index may be 30. In another configuration, the first symbol duration may be four times greater than the second symbol duration, the first and second frequency bandwidths may be 40 megahertz, the first valid start tone index may be −250, the first valid end tone index may be 250, the second valid start tone index may be −62, and the second valid end tone index may be 62. In another configuration, the first symbol duration may be four times greater than the second symbol duration, the first and second frequency bandwidths may be 80 megahertz, the first valid start tone index may be −506, the first valid end tone index may be 506, the second valid start tone index may be −126, and the second valid end tone index may be 126. In another configuration, the first set of DC tones may include three DC tones located at tone indices −1, 0, and 1, and the second set of DC tones may include three DC tones located at tone indices −1, 0, and 1. In another configuration, the first set of DC tones may include eleven DC tones located at tone indices −5, −4, −3, −2, −1, 0, 1, 2, 3, 4, and 5, and the second set of DC tones may include five DC tones located at tone indices −2, −1, 0, 1, and 2 or three DC tones located at tone indices −1, 0, and 1. In another configuration, the first set of DC tones may include seven DC tones located at tone indices −3, −2, −1, 0, 1, 2, and 3, and the second set of DC tones may include five DC tones located at tone indices −2, −1, 0, 1, and 2 or three DC tones located at tone indices −1, 0, and 1. In another configuration, the first symbol duration may be two times greater than the second symbol duration, the first and second frequency bandwidths may be 20 megahertz, the first valid start tone index may be −122, the first valid end tone index may be 122, the second valid start tone index may be −61, and the second valid end tone index may be 61. In another configuration, the first symbol duration may be two times greater than the second symbol duration, the first and second frequency bandwidths may be 40 megahertz, the first valid start tone index may be −250, the first valid end tone index may be 250, the second valid start tone index may be −125, and the second valid end tone index may be 125. In another configuration, the first symbol duration may be two times greater than the second symbol duration, the first and second frequency bandwidths may be 80 megahertz, the first valid start tone index may be −506, the first valid end tone index may be 506, the second valid start tone index may be −253, and the second valid end tone index may be 253. In another configuration, the first tone plan may be based on the second tone plan. In one aspect, the first symbol duration may be four times greater than the second symbol duration, the first valid start tone index may be equal to the second valid start tone index multiplied by four, and the first valid end tone index may be equal to the second valid end tone index multiplied by four. In another aspect, the second set of DC tones may include one DC tone, and the first set of DC tones may include three DC tones located at tone indices −1, 0, and 1. In yet another aspect, the second set of DC tones may include three DC tones, and the first set of DC tones may include seven DC tones located at tone indices −3, −2, −1, 0, 1, 2, and 3. In another configuration, the first frequency bandwidth may be 20 megahertz, the first valid start tone index may be −112, and the first valid end tone index may be 112. In another configuration, the first frequency bandwidth may be 40 megahertz, the first valid start tone index may be −232, and the first valid end tone index may be 232. In yet another configuration, the first frequency bandwidth may be 80 megahertz, the first valid start tone index may be −488, and the first valid end tone index may be 488. In another configuration, the first symbol duration may be two times greater than the second symbol duration, the first valid start tone index may be equal to the second valid start tone index multiplied by two, and the first valid end tone index may be equal to the second valid end tone index multiplied by two. In another configuration, the second set of DC tones may include three DC tones, and the first set of DC tones may include five DC tones located at tone indices −2, −1, 0, 1, and 2. In another configuration, the second set of DC tones may include three DC tones, and the first set of DC tones may include five DC tones located at tone indices −2, −1, 0, 1, and 2. In another configuration, the second set of DC tones may include five DC tones, and the first set of DC tones may include seven DC tones located at tone indices −3, −2, −1, 0, 1, 2, and 3. In another configuration, the first frequency bandwidth may be 20 megahertz, the first valid start tone index may be −116, and the first valid end tone index may be 116. In another configuration, the first frequency bandwidth may be 40 megahertz, and the first valid start tone index may be −244, and the first valid end tone index may be 244. In another configuration, the first frequency bandwidth may be 80 megahertz, the first valid start tone index may be −500, and the first valid end tone index may be 500.

The receiver 705, the processing system 710, the tone plan component 724, and/or the transmitter 715 may be configured to perform one or more functions discussed above with respect to blocks 605, 610, 615, and 620 of FIG. 6. The receiver 705 may correspond to the receiver 512. The processing system 710 may correspond to the processor 504. The transmitter 715 may correspond to the transmitter 510. The tone plan component 724 may correspond to the tone plan component 124 and/or the tone plan component 524.

Moreover, means for transmitting user data in a first symbol of a first symbol type may comprise the processing system 710, the tone plan component 724, and/or the transmitter 715. Means for transmitting an LTF in a second symbol of a second symbol type may comprise the processing system 710, the tone plan component 724, and/or the transmitter 715. Means for determining the first tone plan may comprise the processing system 710 and/or the tone plan component 724. Means for determining the second tone plan may comprise the processing system 710 and/or the tone plan component 724.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of operating a wireless device, comprising:

transmitting user data in a plurality of first symbols, wherein each first symbol of the plurality of first symbols is a data symbol, wherein each first symbol of the plurality of first symbols has a first symbol duration, a first frequency bandwidth, and a first tone plan, wherein the first tone plan comprises a first valid start tone index, a first valid end tone index, and a first set of direct current (DC) tones; and transmitting a long training field (LTF) in a plurality of second symbols, wherein each second symbol of the plurality of second symbols is an LTF symbol, wherein each second symbol of the plurality of second symbols has a second symbol duration that is less than the first symbol duration, a second frequency bandwidth, and a second tone plan, wherein the second tone plan comprises a second valid start tone index, a second valid end tone index, and a second set of DC tones, *wherein the second valid start tone index is a function of the first valid start tone index, the second valid end tone index is a function of the first valid end tone index, and the first symbol duration is two times greater than the second symbol duration, and wherein at least one of:*

(*i*) *the first and second frequency bandwidths are 20 megahertz, the first valid start tone index is −122, the first valid end tone index is 122, the second valid start tone index is −61, and the second valid end tone index is 61,*

*ii*) *the first and second frequency bandwidths are 40 megahertz, the first valid start tone index is −250, the first valid end tone index is 250, the second valid start tone index is −125, and the second valid end tone index is 125, or*

(*iii*) *the first and second frequency bandwidths are 80 megahertz, the first valid start tone index is −506, the first valid end tone index is 506, the second valid start index is −253, and the second valid end tone index is 253.*

[2. The method of claim 1, further comprising:

determining the first tone plan associated with the plurality of first symbols based on configuration information; and determining the second tone plan associated with the plurality of second symbols based on the configuration information.]

[3. The method of claim 1, wherein the second valid start tone index is a function of the first valid start tone index, and the second valid end tone index is a function of the first valid end tone index.]

4. The method of claim 1, wherein the first set of DC tones includes three DC tones located at tone indices −1, 0, and 1, and wherein the second set of DC tones includes one DC tone located at tone index 0.

5. The method of claim 1, wherein the first set of DC tones includes eleven DC tones located at tone indices −5, −4, −3, −2, −1, 0, 1, 2, 3, 4, and 5, and wherein the second set of DC tones includes three DC tones located at tone indices −1, 0, and 1 or one DC tone located at tone index 0.

6. The method of claim 1, wherein the first set of DC tones includes seven DC tones located at tone indices −3, −2, −1, 0, 1, 2, and 3, and wherein the second set of DC tones includes three DC tones located at tone indices −1, 0, and 1 or one DC tone at tone index 0.

7. The method of claim 1, wherein the first set of DC tones includes three DC tones located at tone indices −1, 0, and 1, and wherein the second set of DC tones includes three DC tones located at tone indices −1, 0, and 1.

8. The method of claim 1, wherein the first set of DC tones includes eleven DC tones located at tone indices −5, −4, −3, −2, −1, 0, 1, 2, 3, 4, and 5, and wherein the second set of DC tones includes five DC tones located at tone indices −2, −1, 0, 1, and 2 or three DC tones located at tone indices −1, 0, and 1.

9. The method of claim 1, wherein the first set of DC tones includes seven DC tones located at tone indices −3, −2, −1, 0, 1, 2, and 3, and wherein the second set of DC tones includes five DC tones located at tone indices −2, −1, 0, 1, and 2 or three DC tones located at tone indices −1, 0, and 1.

[10. The method of claim 1, wherein the first symbol duration is two times greater than the second symbol duration, the first and second frequency bandwidths are 20 megahertz, the first valid start tone index is −122, the first valid end tone index is 122, the second valid start tone index is −61, and the second valid end tone index is 61.]

[11. The method of claim 1, wherein the first symbol duration is two times greater than the second symbol duration, the first and second frequency bandwidths are 40 megahertz, the first valid start tone index is −250, the first valid end tone index is 250, the second valid start tone index is −125, and the second valid end tone index is 125.]

[12. The method of claim 1, wherein the first symbol duration is two times greater than the second symbol duration, the first and second frequency bandwidths are 80 megahertz, the first valid start tone index is −506, the first valid end tone index is 506, the second valid start tone index is −253, and the second valid end tone index is 253.]

13. The method of claim 1, wherein the DC tones have zero amplitude and non-DC tones include guard tones, data tones, and pilot tones, wherein the guard [tone] *tones* have zero amplitude, the data tones include data to be transmitted, and pilot tones include known information for channel estimation.

14. The method of claim 1, wherein a plurality of tones within each respective LTF symbol is grouped according to a group number to reduce LTF symbol overhead.

15. The method of claim 1, wherein the second symbol duration and information within each respective LTF symbol are compressed to reduce LTF symbol overhead.

16. The method of claim 15, wherein the second valid start tone index and the second valid end tone index of each respective LTF symbol are compressed based on at least one of: a third valid start tone index or a third valid end tone index.

17. The method of claim 1, wherein transmitting the LTF in the plurality of second symbols includes transmitting the LTF in an upshifted subset of tone indices associated with the plurality of second symbols.

18. The method of claim 1, wherein transmitting the LTF in the plurality of second symbols includes transmitting the LTF in a downshifted subset of tone indices associated with the plurality of second symbols.

19. An apparatus for wireless communication, comprising:

means for transmitting user data in a plurality of first symbols, wherein each first symbol of the plurality of first symbols is a data symbol, wherein each first symbol of the plurality of first symbols has a first symbol duration, a first frequency bandwidth, and a first tone plan, wherein the first tone plan comprises a first valid start tone index, a first valid end tone index, and a first set of direct current (DC) tones; and means for transmitting a long training field (LTF) in a plurality of second symbols, wherein each second symbol of the plurality of second symbols is an LTF symbol, wherein each second symbol of the plurality of second symbols has a second symbol duration that is less than the first symbol duration, a second frequency bandwidth, and a second tone plan, wherein the second tone plan comprises a second valid start tone index, a second valid end tone index, and a second set of DC tones, *wherein the second valid start tone index is a function of the first valid start tone index, the second valid end tone index is a function of the first valid end tone index, and the first symbol duration is two times greater than the second symbol duration, and wherein at least one of:*

(*i*) *the first and second frequency bandwidths are 20 megahertz, the first valid start tone index is −122, the first valid end tone index is 122, the second valid start tone index is −61, and the second valid end tone index is 61,*

(*ii*) *the first and second frequency bandwidths are 40 megahertz, the first valid start tone index is −250, the first valid end tone index is 250, the second valid start tone index is −125, and the second valid end tone index is 125, or*

(*iii*) *the first and second frequency bandwidths are 80 megahertz, the first valid start tone index is −506, the first valid end tone index is 506, the second valid start tone index is −253, and the second valid end tone index is 253.*

[20. The apparatus of claim 19, wherein the second valid start tone index is a function of the first valid start tone index, and the second valid end tone index is a function of the first valid end tone index.]

21. An apparatus for wireless communication, comprising:

a memory; and at least one processor coupled to the memory, wherein the at least one processor is configured to:

transmit user data in a plurality of first symbols, wherein each first symbol of the plurality of first symbols is a data symbol, wherein each first symbol of the plurality of first symbols has a first symbol duration, a first frequency bandwidth, and a first tone plan, wherein the first tone plan comprises a first valid start tone index, a first valid end tone index, and a first set of direct current (DC) tones; and transmit a long training field (LTF) in a plurality of second symbols, wherein each second symbol of the plurality of second symbols is an LTF symbol, wherein each second symbol of the plurality of second symbols has a second symbol duration that is less than the first symbol duration, a second frequency bandwidth, and a second tone plan, wherein the second tone plan comprises a second valid start tone index, a second valid end tone index, and a second set of DC tones, *wherein the second valid start tone index is a function of the first valid start tone index, the second valid end tone index is a function of the first valid end tone index, and the first symbol duration is two times greater than the second symbol duration: and wherein at least one of:*

(*i*) *the first and second frequency bandwidths are 20 megahertz, the first valid start tone index is −122, the first valid end tone index is 122, the second valid start tone index is −61, and the second valid end tone index is 61,*

(*ii*) *the first and second frequency bandwidths are 40 megahertz, the first valid start tone index is −250, the first valid end tone index is 250, the second valid start tone index is −125, and the second valid end tone index is 125, or*

(*iii*) *the first and second frequency bandwidths are 80 megahertz, the first valid start tone index is −506, the first valid end tone index is 506, the second valid start tone index is −253, and the second valid end tone index is 253.*

[22. The apparatus of claim 21, wherein the at least one processor is further configured to:

determine the first tone plan associated with the plurality of first symbols based on configuration information; and determine the second tone plan associated with the plurality of second symbols based on the configuration information.]

[23. The apparatus of claim 21, wherein the second valid start tone index is a function of the first valid start tone index, and the second valid end tone index is a function of the first valid end tone index.]

24. The apparatus of claim 21, wherein the first set of DC tones includes three DC tones located at tone indices −1, 0, and 1, and wherein the second set of DC tones includes one DC tone located at tone index 0.

25. The apparatus of claim 21, wherein the first set of DC tones includes eleven DC tones located at tone indices −5, −4, −3, −2, −1, 0, 1, 2, 3, 4, and 5, and wherein the second set of DC tones includes three DC tones located at tone indices −1, 0, and 1 or one DC tone located at tone index 0.

26. The apparatus of claim 21, wherein the first set of DC tones includes seven DC tones located at tone indices −3, −2, −1, 0, 1, 2, and 3, and wherein the second set of DC tones includes three DC tones located at tone indices −1, 0, and 1 or one DC tone at tone index 0.

27. The apparatus of claim 21, wherein the first set of DC tones includes three DC tones located at tone indices −1, 0, and 1, and wherein the second set of DC tones includes three DC tones located at tone indices −1, 0, and 1.

28. The apparatus of claim 21, wherein the first set of DC tones includes eleven DC tones located at tone indices −5, −4, −3, −2, −1, 0, 1, 2, 3, 4, and 5, and wherein the second set of DC tones includes five DC tones located at tone indices −2, −1, 0, 1, and 2 or three DC tones located at tone indices −1, 0, and 1.

29. The apparatus of claim 21, wherein the first set of DC tones includes seven DC tones located at tone indices −3, −2, −1, 0, 1, 2, and 3, and wherein the second set of DC tones includes five DC tones located at tone indices −2, −1, 0, 1, and 2 or three DC tones located at tone indices −1, 0, and 1.

[30. The apparatus of claim 21, wherein the first symbol duration is two times greater than the second symbol duration, the first and second frequency bandwidths are 20 megahertz, the first valid start tone index is −122, the first valid end tone index is 122, the second valid start tone index is −61, and the second valid end tone index is 61.]

[31. The apparatus of claim 21, wherein the first symbol duration is two times greater than the second symbol duration, the first and second frequency bandwidths are 40 megahertz, the first valid start tone index is −250, the first valid end tone index is 250, the second valid start tone index is −125, and the second valid end tone index is 125.]

[32. The apparatus of claim 21, wherein the first symbol duration is two times greater than the second symbol duration, the first and second frequency bandwidths are 80 megahertz, the first valid start tone index is −506, the first valid end tone index is 506, the second valid start tone index is −253, and the second valid end tone index is 253.]

33. A non-transitory computer-readable medium having code stored thereon that, when executed, causes at least one processor of a wireless device to:

transmit user data in a plurality of first symbols, wherein each first symbol of the plurality of first symbols is a data symbol, wherein each first symbol of the plurality of first symbols has a first symbol duration, a first frequency bandwidth, and a first tone plan, wherein the first tone plan comprises a first valid start tone index, a first valid end tone index, and a first set of direct current (DC) tones; and transmit a long training field (LTF) in a plurality of second symbols, wherein each second symbol of the plurality of second symbols is an LTF symbol, wherein each second symbol of the plurality of second symbols has a second symbol duration that is less than the first symbol duration, a second frequency bandwidth, and a second tone plan, wherein the second tone plan comprises a second valid start tone index, a second valid end tone index, and a second set of DC tones, *wherein the second valid start tone index is a function of the first valid start tone index, the second valid end tone index is a function of the first valid end tone index, and the first symbol duration is two times greater than the second symbol duration, and wherein at least one of:*

(*i*) *the first and second frequency bandwidths are 20 megahertz, the first valid start tone index is −122, the first valid end tone index is 122, the second valid start tone index is −61, and the second valid end tone index is 61,*

(*ii*) *the first and second frequency bandwidths are 40 megahertz, the first valid start tone index is −250, the first valid end tone index is 250, the second valid start tone index is −125, and the second valid end tone index is 125, or*

(*iii*) *the first and second frequency bandwidths are 80 megahertz, the first valid start tone index is −506, the first valid end tone index is 506, the second valid start tone index is −253, and the second valid end tone index is 253.*

* * * * *